US012548920B2

(12) United States Patent
Hassan et al.

(10) Patent No.: US 12,548,920 B2
(45) Date of Patent: Feb. 10, 2026

(54) SEMI-CLOSED WIRELESS DATA TRANSFER FOR ROTARY JOINTS

(71) Applicant: Analog Devices International Unlimited Company, Limerick (IE)

(72) Inventors: Mohamed Moharram Hassan, Al Jizah (EG); John N. Poelker, Andover, MA (US)

(73) Assignee: Analog Devices International Unlimited Company, Limerick (IE)

( * ) Notice: Subject to any disclaimer, the term of this patent is extended or adjusted under 35 U.S.C. 154(b) by 371 days.

(21) Appl. No.: 18/067,495

(22) Filed: Dec. 16, 2022

(65) Prior Publication Data

US 2023/0361485 A1 Nov. 9, 2023

Related U.S. Application Data

(60) Provisional application No. 63/338,340, filed on May 4, 2022.

(51) Int. Cl.

*H01P 1/06* (2006.01)
*H01Q 21/06* (2006.01)
*H01Q 21/24* (2006.01)

(52) U.S. Cl.

CPC .......... *H01Q 21/24* (2013.01); *H01Q 21/061* (2013.01)

(58) Field of Classification Search

CPC .. H01Q 21/005; H01Q 21/061; H01Q 21/065; H01Q 21/20; H01Q 21/24;

(Continued)

(56) References Cited

U.S. PATENT DOCUMENTS 7,352,929 B2 4/2008 Hagen et al.
9,520,914 B2 12/2016 Khan (Continued)

FOREIGN PATENT DOCUMENTS

CN 104823092 A 8/2015
CN 111902998 A 11/2020
WO 2014/059129 4/2014

OTHER PUBLICATIONS

European Search Report issued in European Patent Application No. 23153407 on Sep. 20, 2023.

(Continued)

*Primary Examiner* — Thai Pham

(74) *Attorney, Agent, or Firm* — ArentFox Schiff LLP

(57) ABSTRACT

Systems configured to implement semi-closed wireless data transfer for rotary joints are disclosed. An example system includes first and second RF transceivers, to be included in different components of a rotary joint. The first and second RF transceivers implement elliptically (e.g., circularly) polarized antennas to realize a short distance communication link (e.g., a 60 GHz short distance communication link) between the two components of a rotary joint. The example system further includes an open-ended waveguide (OEWG) between the first and second RF transceivers, for receiving, at a first end of the OEWG, wireless signals transmitted by one of the first and second RF transceivers, transmitting the received signals through the OEWG, and radiating, at a second end of the OEWG, wireless signals indicative of the received wireless signals, to be received by another one of the first and second RF transceivers.

20 Claims, 13 Drawing Sheets

(58) Field of Classification Search
CPC .. H01P 1/06; H01P 1/066; H01P 1/122; H01P 3/00
See application file for complete search history.

(56) References Cited

U.S. PATENT DOCUMENTS

| | | | | |
|---|---|---|---|---|
| 9,748,802 | B2 | 8/2017 | Krumme | |
| 9,762,325 | B2 | 9/2017 | Aitken et al. | |
| 10,653,498 | B2 | 5/2020 | Boccoleri et al. | |
| 10,800,050 | B2 | 10/2020 | Hosek et al. | |
| 10,862,579 | B2 | 12/2020 | Rosenband et al. | |
| 2007/0237528 | A1 | 10/2007 | Popp | |
| 2012/0235882 | A1* | 9/2012 | Iverson | H01Q 3/02 333/256 |
| 2013/0181791 | A1* | 7/2013 | McCarthy | H01P 1/06 333/256 |
| 2015/0372751 | A1 | 12/2015 | Shinoda | |
| 2021/0099215 | A1* | 4/2021 | Hormis | H04L 5/0023 |
| 2021/0351901 | A1* | 11/2021 | Hassan | H04L 5/06 |

OTHER PUBLICATIONS

Patyuchenko, *60 GHz Wireless Data Interconnect for Slip Ring Applications*, Analog Devices, Technical Article, @ 2019, 5 pages.

* cited by examiner

500

700

SEMI-CLOSED WIRELESS DATA TRANSFER FOR ROTARY JOINTS

CROSS REFERENCE TO RELATED APPLICATIONS

This application claims the benefit of and priority from Provisional Patent Application No. 63/338,340, filed May 4, 2022, titled "SEMI-CLOSED WIRELESS DATA TRANSFER FOR ROTARY JOINTS," the disclosure of which is hereby incorporated by reference herein in its entirety.

TECHNICAL FIELD OF THE DISCLOSURE

The present disclosure generally relates to data transfer in rotary joints.

BACKGROUND

Continuous wireless high-speed data transfer between various subsystems is becoming more and more important for the emerging Internet of Things (IoT) and industrial automation applications. Radio systems may be used for wireless data transfer in such applications. Radio systems are systems that transmit and receive signals in the form of electromagnetic waves in the radio frequency (RF) range of approximately 3 kilohertz (kHz) to 300 gigahertz (GHz). Radio systems are commonly used for wireless communications. Two radio units in the same radio system can exchange information wirelessly using protocols such as Bluetooth™, wireless local area network (WLAN) or IEEE 802.15.4 compliant protocols. Some examples of such radio systems include wireless sensor network, Bluetooth enabled handsets, and smart home systems.

It would be desirable to use radio systems for data transfer between rotating components (e.g., in a rotary joint) as it could overcome the drawbacks of using optical signals in such applications because optical solutions require precise alignment of very narrow optical beams and can easily be affected by contamination (e.g., dust or dirt) between the rotating components. However, ensuring a continuous and full-duplex data transmission in a rotary joint is not trivial and improvements for currently available solutions would be desirable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described in the present disclosure are set forth in the description below and the accompanying drawings.

For purposes of illustrating semi-closed wireless data transfer for rotary joints, proposed herein, it might be useful to first understand phenomena that may come into play in systems with moveable components. The following foundational information may be viewed as a basis from which the present disclosure may be properly explained. Such information is offered for purposes of explanation only and, accordingly, should not be construed in any way to limit the broad scope of the present disclosure and its potential applications.

The fourth industrial revolution drives digital manufacturing forward by implementing new scenarios into the production process. These scenarios rely on fundamental design principles that include device interconnection, information transparency, technical assistance, and decentralized decisions. The realization of all these principles in modern smart factories would not be possible without advanced wireless communication technologies. They enable multi-faceted applications for a broad range of areas including process automation, asset tracking, machinery control, intralogistics, and infrastructure networking.

Smart factories incorporate various cyber-physical systems that require faster and more reliable wireless solutions to handle ever increasing amounts of data in the toughest industrial settings. The main drivers facilitating new developments of these solutions to be deployed in highly demanding industry scenarios include the realization of data transmission from moving equipment where it was not possible or was limited before.

Figure 1:
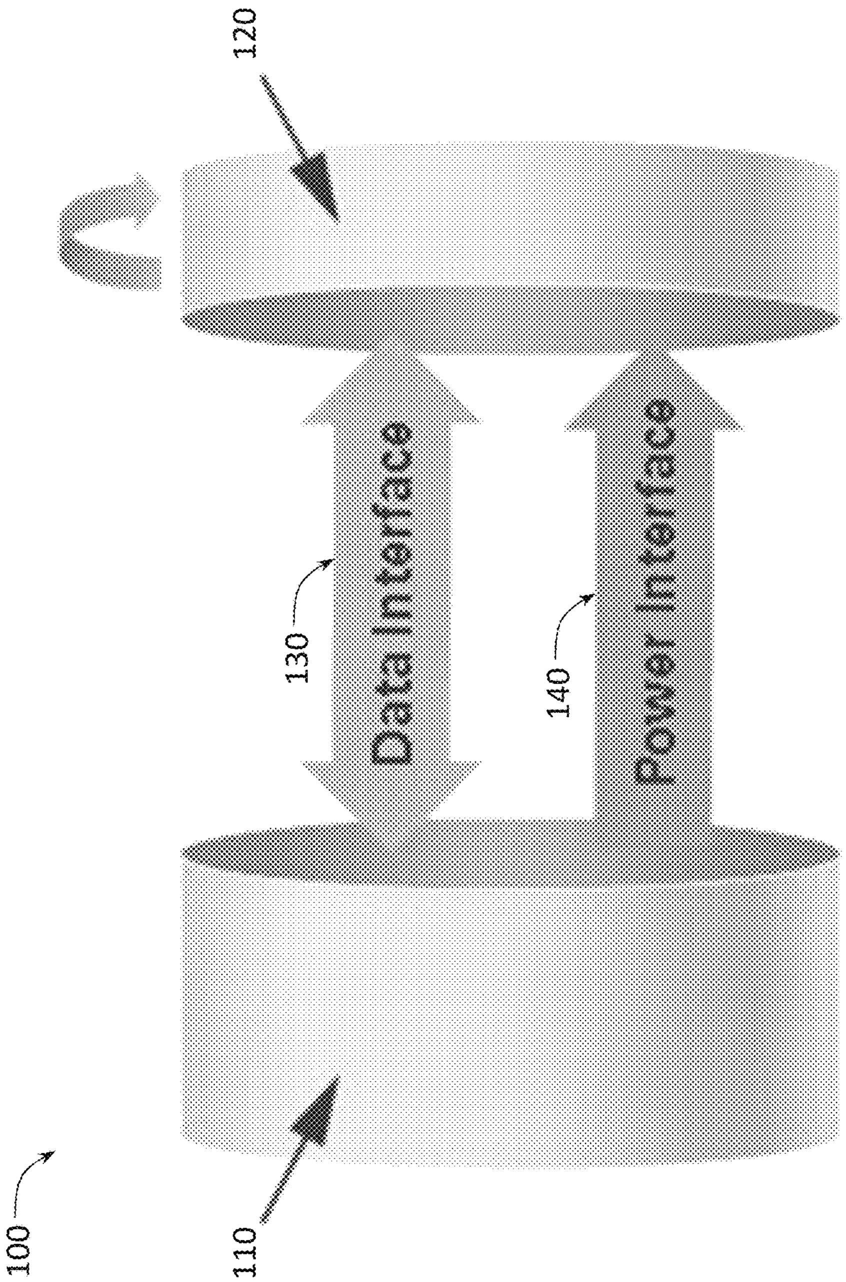
FIG. 1 provides a block diagram illustrating a rotary joint.

Modern industrial applications impose certain requirements on a communication interface between mechanically rotating subsystems. A rotary joint, also often interchanged with the term slip ring, is an assembly for transmitting data and power across a rotating connection. FIG. 1 illustrates an example rotary joint assembly 100. As shown in FIG. 1, the rotary joint 100 may include a first component 110 and a second component 120. At least one of the first and second components 110, 120 is configured to rotate with respect to the other. For example, in some embodiments, the second component 120 may be configured to rotate with respect to the first component 110 and the first component 110 may be fixed/static. Thus, in some embodiments, the first component 110 may be a stator, meaning that it is not configured to rotate, while the second component 120 may be a rotor, meaning that it is configured to rotate with respect to the first component 110. In other embodiments, both of the first and second components 110, 120 may be configured to rotate.

FIG. 1 further shows a double arrow 130 that schematically represents wireless data interface between the first and second components 110, 120. Furthermore, FIG. 1 also shows an arrow 140 that schematically represents wireless power transfer from the first component 110 to the second component 120, although in other embodiments the direction of power transfer may be reversed compared to what is shown. The rotary joint 100 may be used in a large variety of applications such as security cameras, industrial automation equipment, robotics, radar systems, connectors, electronics, input/output (I/O) assemblies, etc.

The growing need for faster and more reliable data transmission between rotating components (e.g., between first and second components 110, 120 as shown in FIG. 1) in modern industrial scenarios imposes strict requirements on bandwidth, crosstalk, and electromagnetic interference (EMI) performance of the data interfaces used in rotary joints. Meeting these requirements is essential to guarantee real-time operation, continuous uptime, and maximum efficiency of the corresponding industrial equipment. For example, in some implementations, industrial rotary data interface assemblies must ensure constant transmission quality at very fast rotational speeds of 5000 rotations per minute (rpm) to 6000 rpm at rates of typically 100 megabit per second (Mbps). In most cases these data rates are sufficient, but some specialized applications require faster transmission at 1 gigabit per second (Gbps) and higher, which is becoming a fairly standard benchmark nowadays. Industrial applications also call for support of IEEE802.3-based (Ethernet) and other industrial bus protocols, as well as deterministic real-time communication, to permit time sensitive applications and IoT functionality. Data interface solutions designed for these applications should be immune to physical misalignments, electromagnetic interferences, and crosstalk to enable error-free data transmission with bit error rates (BER) of $1\times10^{-12}$ or better. Contaminants present in the industrial environment should not affect the operation of a rotary joint that ideally must be maintenance-free and not suffer from wear. Finally, the data interface technology must be compatible with power transmission subsystem of a rotary joint assembly to meet all functional requirements of a target application.

There are different types of rotary joints that vary in terms of their functional features, form factor, rotational speeds (rpm), maximum data rate, power ranges, type of supported interfaces, channel count, and many other design aspects shaped by application requirements. Among these design considerations, the data interface has some of the most critical requirements and it is therefore crucial to make the right choice of technology for its implementation in a slip ring assembly. Data communication technologies used to realize this function can generally be classified into contacting and contactless. They abound with many variations depending on the type of coupling they utilize in order to realize a communication channel for data transmission.

Conventional data interface technologies offer numerous sets of features and capabilities that can meet typical requirements of industrial slip ring applications. However, the fourth industrial revolution imposes strict requirements on configurability, reliability, and speed rates of data interfaces for slip ring applications that cannot always be met by conventional technologies existing today.

Embodiments of the present disclosure provide a novel solution based on a contactless technology that overcomes some critical limitations of other methods by relying on electromagnetic millimeter waves (mm-waves), i.e., electromagnetic radiation with frequencies between about 30 GHz to about 300 GHz, corresponding to wavelengths on a millimeter scale, e.g., wavelengths between 10 mm for the 30 GHz frequency and 1 mm for the 300 GHz frequency, for transmission of data. In addition to wireless data transmission of mm-waves, the proposed solution employs a waveguide between the first and second components 110, 120. The waveguide is configured to act as an antenna, receiving, at one end of the waveguide, a signal transmitted by one of the first and second components 110, 120 of a rotary joint assembly, transmitting the received signal through the body of the waveguide, and re-radiating the signal at the other end of the waveguide, where the re-radiated signal is to be wirelessly received by the other one of the first and second components 110, 120 of a rotary joint assembly. In some embodiments, the waveguide may be an open-ended waveguide (OEWG).

In some embodiments, both ends of the waveguide may be OEWG ends. In other embodiments, one end of the waveguide may be an OEWG end, and the other end may be flared. In still other embodiments, both ends of the waveguide may be flared. The proposed solution enables not only a compact and a cost-effective data interconnect for target applications, but thanks to its high reconfigurability and innovative approach it also becomes a compelling candidate for the elaboration of application concepts of novel art.

The emergence of low-cost microwave component fabrication technologies has recently made them a commercial reality for broad market applications. In particular, mm-wave 60 GHz technologies are receiving increased attention from today's broad market due to the unique advantages of this frequency band located in the upper region of the microwave spectrum. This global license-free and largely uncongested band offers a wide bandwidth of up to 9 GHz, which permits high data rates, provides short wavelengths that allow for a compact system design, and that has a high ratio of atmospheric attenuation, which results in a low interference level. These benefits made 60 GHz technologies attractive for such applications as multigigabit WiGig networks (IEEE 802.11ad and the next-generation IEEE 802.11ay standards), wireless backhaul connectivity, and wireless transmission of high-definition video (a proprietary WirelessHD/UltraGig standard).

In the industrial area, 60 GHz technologies are mostly used for mm-wave radar sensors and lower data rate telemetry links. However, rapid advancements in this domain make 60 GHz technologies very promising for the realization of high-speed, ultralow latency data transmission in industrial subsystems.

Disclosed herein are systems configured to implement full-duplex semi-closed wireless data transfer for rotary joints. An example system includes a first RF transceiver, to be included in one component of a rotary joint (e.g., in the first component 110 of the rotary joint 100), and a second RF transceiver, to be included in the other component of a rotary joint (e.g., in the second component 120 of the rotary joint 100). The first and second transceivers may be configured to implement elliptically (e.g., circularly) polarized antennas having wide-beam, low-gain radiation patterns to realize a short distance communication link (e.g., a 60 GHz short distance communication link) between the two components of a rotary joint. In some embodiments, the radiation patterns may be fixed-beam (i.e., not steerable). The example system further includes a waveguide (e.g., an OEWG) between the first and second RF transceivers, for receiving, at a first end of the waveguide, wireless signals transmitted by one of the first and second RF transceivers, transmitting the received signals through the waveguide, and radiating, at a second end of the waveguide, wireless signals indicative of the received wireless signals, to be received by another one of the first and second RF transceivers. Because such an RF system interfaces the open solution based on RF electronics (e.g., the first and second RF transceivers) with a closed waveguide, the data transfer provided by the RF system may be referred to as "semi-closed." Such an RF system may provide a mm-wave, high-speed, wideband semi-closed wireless communication link in a manner that is associated with simpler design and operation, mechanical integrity, and reduced power consumption, compared to conventional solutions.

As will be appreciated by one skilled in the art, aspects of the present disclosure, in particular aspects of semi-closed wireless data transfer for rotary joints as described herein, may be embodied in various manners such as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of any methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing rotary joints or other systems with moveable components, RF transmitters, receivers, transceivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the examples described herein. In the following description, reference is made to the drawings, where like reference numerals can indicate identical or functionally similar elements. It will be understood that elements illustrated in the drawings are not necessarily drawn to scale. Further, some embodiments can incorporate any suitable combination of features from two or more drawings. Moreover, it will be understood that certain embodiments can include more elements than illustrated in a drawing and/or a subset of the elements illustrated in a drawing. For example, any of the components (e.g., any of the antennas or any of the processing circuitry) illustrated in the present drawings may be implemented as a plurality of such components which, equivalently, act as a single one of those components described herein. In another example, various circuits and arrangements described herein may include further components that are not specifically illustrated in the present drawings, such as resistors, capacitors, various electrical interconnects (i.e., electrically conductive structures configured to provide electrical connectivity between various circuit components), etc.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection (e.g., an indirect electrical connection) through one or more passive or active intermediary devices/components. In another example, the term "circuit" means one or more passive and/or active components that are arranged to cooperate with one another to provide a desired function. Sometimes, in the present descriptions, the term "circuit" may be omitted. If used, the terms "substantially," "approximately," "about," etc., may be used to generally refer to being within +/−20% of a target value, e.g., within +/−10% of a target value, based on the context of a particular value as described herein or as known in the art.

Example RF System with a Mm-Wave Communication Link

Figure 2:
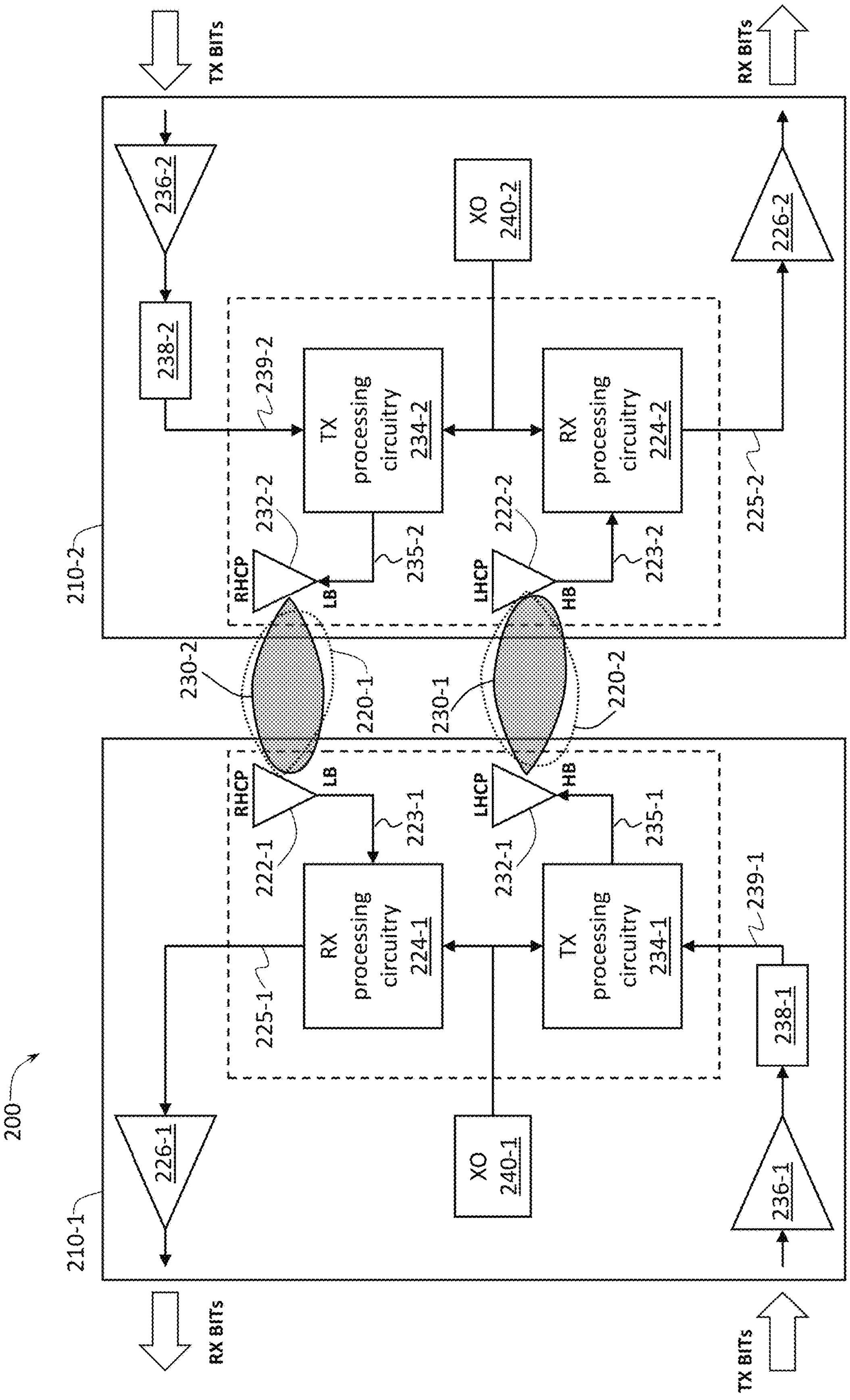
FIG. 2 provides a block diagram illustrating an example RF system for implementing a highly integrated short communication link that enables full-duplex wireless data transfer for rotary joints, according to some embodiments of the present disclosure.

FIG. 2 provides a block diagram illustrating an example RF system 200 for implementing a mm-wave short communication link that enables full-duplex wireless data transfer for rotary joints, according to some embodiments of the present disclosure. As shown in FIG. 2, the RF system 200 may include two transceivers 210, illustrated as a first transceiver 210-1 and a second transceiver 210-2, configured to communicate with one another via mm-wave radiation. Similar to the notation used to label the first transceiver 210-1 and the second transceiver 210-1, in the following, analogous components of the first and second transceivers 210 may be labeled with a common three-digit reference numeral, followed by a dash and a numeral "1" to indicate the component of the first transceiver 210-1 and followed by a dash and a numeral "2" to indicate the component of the second transceiver 210-2. Each transceiver 210 of the RF system 200 may include both a receive (RX) circuitry (i.e., a receiver) and a transmit (TX) circuitry (i.e., a transmitter), so that the unit can both receive and transmit data. As shown in FIG. 2, for each transceiver 210, the RX circuitry may include an RX antenna array 222, an RX processing circuitry 224, and, optionally, an RX comparator 226 (which may be used to convert the RX analog baseband output to a logic level), while the TX circuitry may include a TX antenna array 232, a TX processing circuitry 234, and, optionally, a TX comparator 236 (which may be used to establish a fixed level TX baseband input) and a modulation network 238. As also shown in FIG. 2, in some embodiments, each transceiver 210 may also include a crystal oscillator (denoted in FIG. 2 as "XO") 240.

While the RF system 200 shown in FIG. 2 illustrates only two of the RF transceivers 210, in general, the radio system 200 may include any number of the RF transceivers 210.

Figure 6:
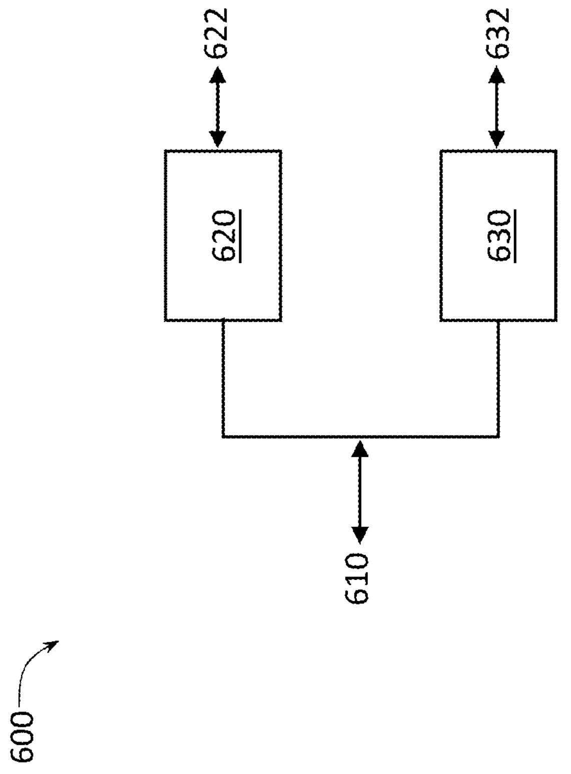
FIG. 6 provides a schematic illustration of a diplexer for an RF system configured to implement full-duplex wireless data transfer for rotary joints, according to some embodiments of the present disclosure.
Figure 10:
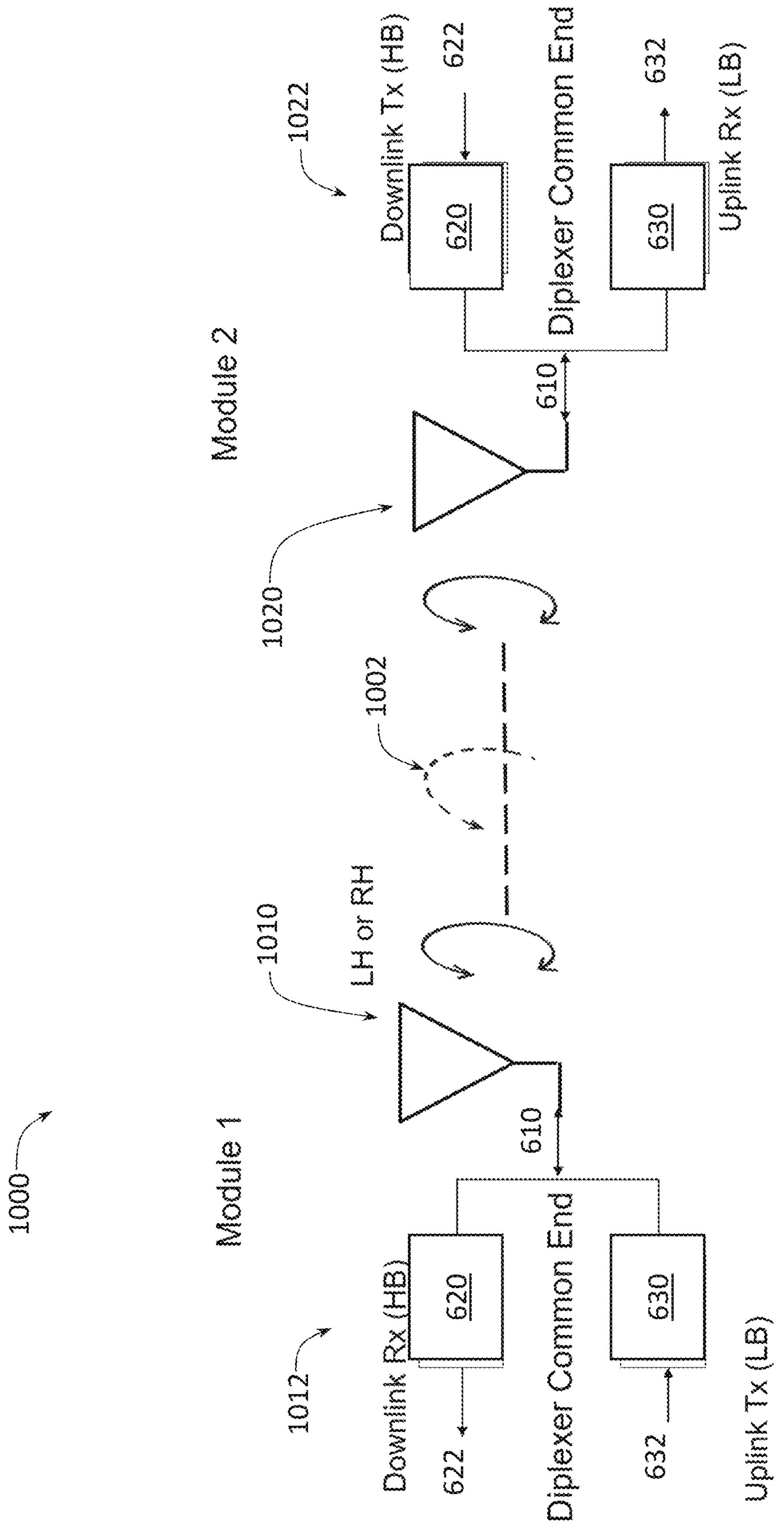
FIG. 10 provides a schematic illustration of a second configuration for a wireless communication system arranged to implement uplink and downlink communications using two modules with elliptically polarized antennas for implementing full-duplex wireless data transfer, according to some embodiments of the present disclosure.

As will be described in greater detail below, in various embodiments, any of the RF transceivers 210 may use orthogonal polarizations, frequency separation, physical distance, or frequency diplexer (the latter may be implemented as shown in FIG. 6 and FIG. 10). In some embodiments, any of the RF transceivers 210 may separate the RX and TX channels in frequency bands using novel circuitry (e.g., a mm-wave frequency range may be separated into TX and RX sub-bands). In some embodiments, any of the RF transceivers 210 may use up and down conversion in the chipset so that the link input and output are at baseband frequency. In some embodiments, any of the RF transceivers 210 may utilize an integrated circuit (IC) with integrated modulation and demodulation functionalities to eliminate the need of extra data converters and modem for lowest possible latency. In some embodiments, any of the RF transceivers 210 may incorporate some or all of the necessary passive circuitry in the laminate IC package.

In some embodiments, each of the RF transceivers 210 can be a device used to initiate a communication, such as a wireless sensor, a handset, a smart home system device, a computer, a personal digital assistant (PDA), a laptop or electronic notebook, a cellular telephone, an i-Phone™, i-Pad™, a Google Droid™ phone, an Internet Protocol (IP) phone, or any other device, component, element, or object capable of initiating voice, audio, video, media, or data exchanges within the RF system 200. In some embodiments, any of the RF transceivers 210 may be implemented as a radio access point device that can connect to a wired network using, e.g., Bluetooth™, WLAN (e.g., Wi-Fi), IEEE 802.15.4 protocol, 3rd Generation Partnership Project (3GPP) network (e.g., 3G, 4G, Long Term Evolution (LTE), 5G) protocols, non-3GPP network (e.g., WiMAX) protocols, or any other appropriate standard. In some embodiments, any of the RF transceivers 210 may include software (or reciprocating software) that can coordinate in order to achieve their operations and/or features, as outlined herein. In some embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

In some embodiments, one of the RF transceivers 210 may be implemented in a stator and another one in a rotor of a rotary joint. For example, the first transceiver 210-1 may be implemented in the first component 110 of the rotary joint 100 shown in FIG. 1, while the second transceiver 210-2 may be implemented in the second component 120 of the rotary joint 100. Although many RF transceivers are known in the art, e.g., transceivers used in wireless communications involving user equipment devices and base stations (i.e., for relatively long-distance wireless communications), the transceivers 210 include several features that make them unique and suitable for use in a rotary joint assembly.

One of the unique features of the transceivers 210 that make them particularly suitable for rotary joint applications is the design of their RX and TX antenna arrays 222, 232. In context of radio systems, an antenna is a device that serves as an interface between radio waves propagating wirelessly through space and electric currents moving in metal conductors used with a transmitter or a receiver. During transmission, a radio transmitter may supply an electric current to antenna's terminals, and the antenna may radiate the energy from the current as radio waves (i.e., electromagnetic radiation in an RF range). During reception, an antenna may intercept some of the power of a wireless radio wave/radiation in order to produce an electric current at its terminals, which current may subsequently be amplified by the receiver.

Each of the RX and TX antenna arrays 222, 232 may be characterized by their respective radiation beam patterns. The RX antenna array 222 may be configured to capture RF radiation within an RX beam 220 (illustrated in FIG. 2 with a dotted contour for each of the RX antenna arrays 222) and to generate an RX signal 223 (an electrical signal) based on (e.g., representative or indicative of) the RF radiation captured by the RX antenna array 222. The RX signal 223 may then be provided to the RX processing circuitry 224 for processing. The TX antenna array 232 may be configured to transmit wireless RF radiation as a TX beam 230 (illustrated in FIG. 2 with a solid gray contour for each of the TX antenna arrays 232), based on a TX signal 235 (an electrical signal) provided from the TX processing circuitry 234.

Unique to rotary joint applications, the RX beams 220 and the TX beams 230 of the RF system 200 may be relatively wide. For example, in some embodiments, a beamwidth of each of the RX beam and the TX beam may be between about 15 and 45 degrees, e.g., between about 20 and 40 degrees, e.g., about 30 degrees (i.e., the RX antenna array 222 and the TX antenna array 232 are wide-beam antennas). This is drastically different from using optical signals to transmit data between components of a rotary joint because optical signals have to have extremely narrow beams (e.g., less than 1 degree). This is also drastically different from using RF signals in wireless communications between base stations and user equipment devices, where the beams have to be narrower, e.g., between 5 and 12 degrees. Configuring the RX and TX antenna arrays 222, 232 to implement such relatively wide beams provides several advantages.

First of all, wide-beam antennas make it easier to arrange the RX and TX antenna arrays 222, 232 of the first and second transceivers 210 so that, even when one of the transceivers 210 is rotating with respect to the other one (or both are rotating) during operation of the RF system 200 implemented in a rotary joint, sufficiently large portion of the TX beam 230-1 of the first transceiver 210-1 overlaps and, therefore, is captured, by the RX beam 220-2 of the second transceiver 210-2 and vice versa (i.e., that sufficiently large portion of the TX beam 230-2 of the second transceiver 210-2 overlaps and, therefore, is captured, by the RX beam 220-1 of the first transceiver 210-1). Thus, during operation of the RF system 200 implemented in a rotary joint, the RX antenna arrays 222 and the TX antenna arrays 232 are to be arranged so that at least a portion of the RF radiation captured by the RX antenna array 222-1 of the first transceiver 210-1 is from the RF radiation transmitted by the TX antenna array 232-2 of the second transceiver 210-2, and at least a portion of the RF radiation captured by the RX antenna array 222-2 of the second transceiver 210-2 is from the RF radiation transmitted by the TX antenna array 232-1 of the first transceiver 210-1. One example of overlapping between the beams 220-1 and 230-2 and between the beams 220-2 and 230-1 is schematically illustrated in FIG. 2, however, in practical implementations, the distance between the transceivers 210 would be larger than what could be illustrated in the space allowed for FIG. 2, and, therefore, the beams 220 and 230 would likely all partially overlap one another at any given time as the orientation of the RX and TX antenna arrays 222, 232 changes when components in which they are implemented are rotated with respect to one another.

Figure 3:
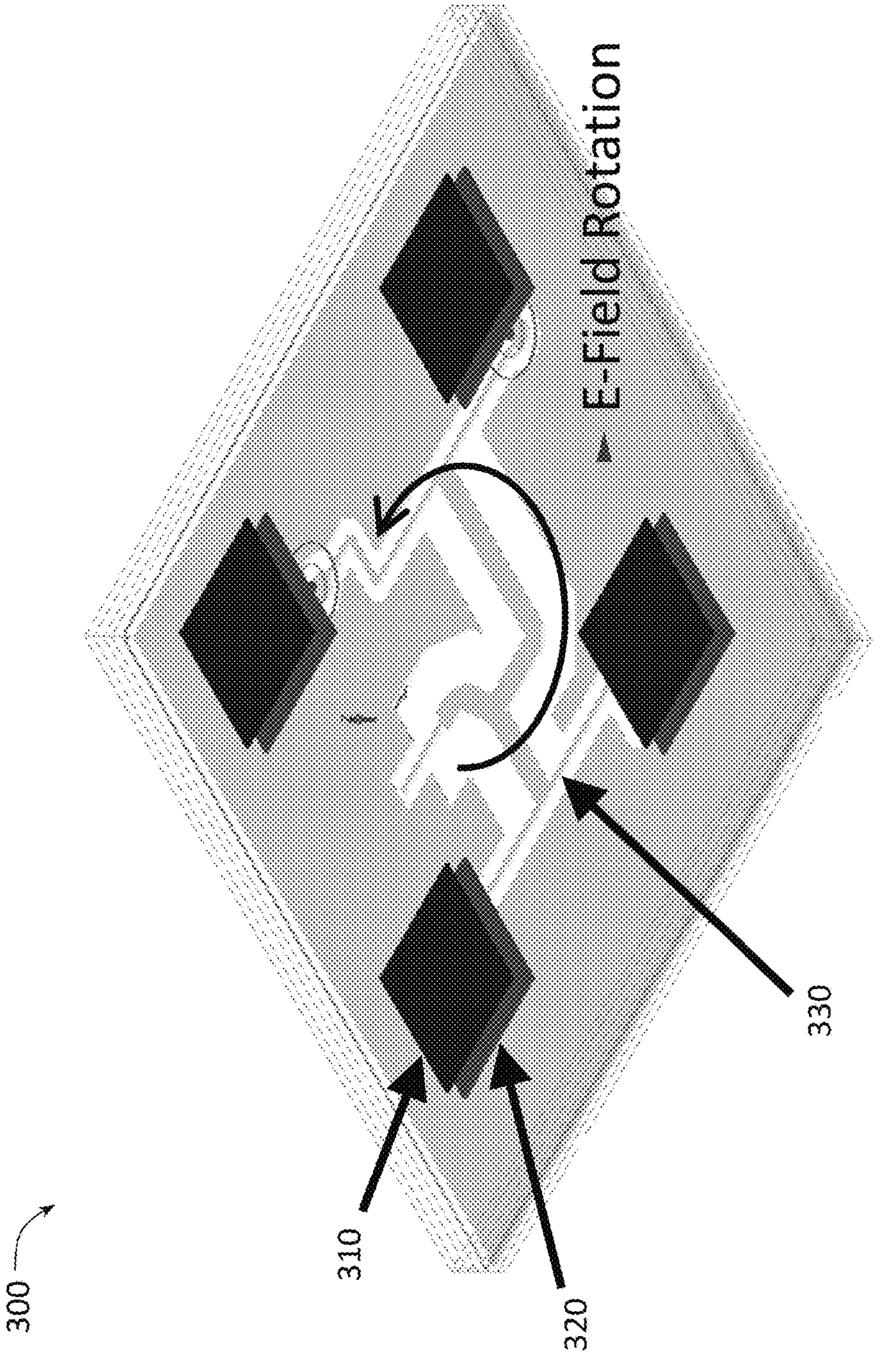
FIG. 3 provides a schematic illustration of a rotating polarization antenna module that may be implemented in an RF system configured to implement full-duplex wireless data transfer for rotary joints, according to some embodiments of the present disclosure.

Another advantage is that implementing RF antennas with wide beams may be done using less antenna elements in an antenna array. In general, more antenna elements in an antenna array are needed to reduce the beamwidth of an RF beam. Using less antenna elements in an antenna array advantageously reduces cost, complexity, and power consumption. In some embodiments, each of the RX and TX antenna arrays 222, 232 may include between 4 and 12 antenna elements, e.g., as is shown in FIG. 3 with 4 antenna elements and described in greater detail below. In the embodiments where the RX and TX antenna arrays 222, 232 are combined to implement a diplexer as described below, the antenna array may include 8 antenna elements. In contrast, the RX and TX antenna arrays used in wireless RF communications between base stations and user equipment devices typically employ much larger of antenna elements, such as 48, 96, and even more.

In some embodiments, the antenna elements of the RX and TX antenna arrays 222, 232 may be implemented as patch antennas. However, in general, any type of individual antenna elements as known in the art may be used to implement the RX and TX antenna arrays 222, 232.

Also unique to rotary joint applications, the RX and TX antenna arrays 222, 232 of the RF system 200 are relatively low-gain. For example, in some embodiments, antenna gain of each of the RX antenna arrays 222 and the TX antenna arrays 232 may be less than about 15 decibel (db), e.g., less than about 13 db. This is drastically different from using RF signals in wireless communications between base stations and user equipment devices, where antenna gains have to be significantly higher, e.g., at least 18 or 24 dB, because signals need to be communicated over much larger distances. For rotary joint applications, typical a distance between the first and second transceivers 210 (or, correspondingly, the distance between the first and second components 110, 120 of the rotary joint 100) may be between about 1 and 30 wavelengths at a center frequency of the RF radiation to be captured by the RX antenna arrays 222 and the RF radiation to be transmitted by the TX antenna arrays 232, e.g., the distance may be between about 0.5 and 15 centimeters (cm), e.g., between about 1 and 10 cm if the center frequency is about 60 GHz. Similar to using smaller number of antenna elements, configuring the RX and TX antenna arrays 222, 232 to be low-gain antennas also provides advantages in terms of reduced cost, complexity, and power consumption.

Yet another feature unique to rotary joint applications is that the RX beams 220 and the TX beams 230 of the RF system 200 are fixed (i.e., the direction of these beams is set with respect to, e.g., the plane of their respective antenna arrays, and is not steerable). This is drastically different from using RF signals in wireless communications between base stations and user equipment devices, where beam steering across a large range of angles is absolutely crucial.

Another feature adapted to rotary joint applications is that, in order to enable full-duplex wireless data transfer for rotary joints, each RF transceiver 210 may include two elliptically/circularly polarized antennas in order to permit rotation of the receiver with respect to the transmitter, which would enable the RF system to implement either fixed or rotating RX and TX link pairs. Such elliptically polarized antennas may use orthogonal (or cross) polarizations to distinguish or isolate RX and TX signals. For example, the TX antenna array 232-1 of the first transceiver 210-1 may be configured to transmit the RF radiation that is left-hand elliptically polarized (left-hand elliptical polarization labeled in FIG. 2 as "LHCP" that stands for "left-hand circularly polarized," where circular polarization is one particular case of elliptical polarization), the TX antenna array 232-2 of the second transceiver 210-2 may be configured to transmit the RF radiation that is right-hand elliptically polarized (right-hand elliptical polarization labeled in FIG. 2 as "RHCP" that stands for "right-hand circularly polarized"), the RX antenna array 222-1 of the first transceiver 210-1 may be configured to capture the RF radiation that is right-hand elliptically polarized, and the RX antenna array 222-2 of the second transceiver 210-2 may be configured to capture the RF radiation that is left-hand elliptically polarized. Thus, within a given transceiver 210, elliptical polarizations of the RX antenna array 222 and the TX antenna array 232 are substantially orthogonal (i.e., one is left-hand and the other is right-hand elliptically polarized), while, when first and second transceivers 210 are used in, respectively, first and second components 110, 120 of a rotating joint, elliptical polarizations of the RX antenna array 222-1 of the first transceiver 210-1 and the RX antenna array 222-2 of the second transceiver 210-2 are substantially orthogonal, as are the elliptical polarizations of the TX antenna array 232-1 of the first transceiver 210-1 and the TX antenna array 232-2 of the second transceiver 210-2.

In some embodiments, frequency separation combined with orthogonal polarizations may be used in order to improve isolation between co-located receiver and transmitter. For example, in some embodiments, each of the RX antenna array 222-1 of the first transceiver 210-1 and the TX antenna array 232-2 of the second transceiver 210-2 may be a low-band (LB) antenna that uses right-hand circular (or elliptical) polarization (labeled in FIG. 2 as "LB RHCP"), while each of the RX antenna array 222-2 of the second transceiver 210-2 and the TX antenna array 232-1 of the first transceiver 210-1 may be a high-band (HB) antenna that uses left-hand circular (or elliptical) polarization (labeled in FIG. 2 as "HB LHCP"). In other embodiments, the LB antenna may use the LHCP and the HB antenna may use the RHCP, i.e., each of the RX antenna array 222-1 of the first transceiver 210-1 and the TX antenna array 232-2 of the second transceiver 210-2 may be a LB antenna that uses left-hand circular (or elliptical) polarization, while each of the RX antenna array 222-2 of the second transceiver 210-2 and the TX antenna array 232-1 of the first transceiver 210-1 may be a HB antenna that uses right-hand circular (or elliptical) polarization. In some embodiments, the high bands of the HB antenna arrays of the transceivers 210-1 and 210-2 may be not completely the same, but at least partially overlapping. In some embodiments, HB ranges of frequencies implemented in the antenna arrays of the RF system 200 may include frequencies above about 60 GHZ, e.g., frequencies between about 61 GHz and 64 GHZ, while LB ranges of frequencies may include frequencies below about 60 GHZ, e.g., frequencies between about 57 GHz and 59 GHz. Further details of using polarization to enable full-duplex wireless data transfer for rotary joints are described below with reference to FIGS. 7-10.

Another one of the unique features of the transceivers 210 that make them particularly suitable for rotary joint applications is the design of their RX and TX processing circuits 224, 234. Characteristic to rotary joint applications, the RX processing circuitry 224 of each of the transceivers 210 may be configured to apply an on-off keying (OOK) demodulation to the RX signal 223 (or to a signal based thereon, e.g., after the RX signal 223 has been downconverted to a lower frequency), to generate a signal indicative of data encoded in the wireless RF radiation captured by the RX antenna array 222. Similarly, the TX processing circuitry 234 of each of the transceivers 210 may be configured to apply OOK modulation to generate the TX signal 235 so that the TX signal 235 is based on a signal indicative of data to be encoded in the wireless RF radiation transmitted by the TX antenna array 234. This is in sharp contrast to modulation/demodulation techniques used in wireless communications between base stations and user equipment devices where higher-order, hierarchical modulation techniques such as quadrature amplitude modulation (QAM) are used, e.g., 1024 QAM.

The RX processing circuitry 224 of each of the transceivers 210 may further be configured to use an RX local oscillator (LO) signal to perform frequency downconversion to generate a lower-frequency RX signal 225 based on the RX signal 223, and the TX processing circuitry 234 may be further configured to use a TX LO signal to perform frequency upconversion to generate the TX signal 235 based on a lower-frequency TX signal 239. For example, in various embodiments, each of the RX signals 223 and the TX signals 235 may be an RF signal with signal frequencies between about 300 MHz and 300 GHz, while each of the lower-frequency RX signals 225 and the lower-frequency TX signals 239 may be a baseband signal with signal frequencies below 300 MHz or an intermediate frequency signal with signal frequencies below the signal frequencies of, respectively, the RX signal and the TX signal. In some embodiments, any of the transceivers 210 may include the crystal oscillator 240 configured to generate a crystal reference signal 241, and where at least one of the RX LO signals used by the RX processing circuitry 224 for downconversion and the TX LO signal used by the TX processing circuitry 234 for upconversion may be based on the crystal reference signal 241. In this manner, one or both of the RX LO signal and the TX LO signal used by the processing circuits of the RF system 200 may be synthesized based on the crystal reference signal, which may be advantageous to other manners of generating such signals in terms of, e.g., temperature drift. In various embodiments, the RX processing circuitry 224 may be configured to perform frequency downconversion and the TX processing circuitry 234 may be configured to perform frequency upconversion in analog domain. In some embodiments, the TX processing circuitry 234 may be driven with a digital logic level signal but the mixing it performs may still be analog.

In some embodiments, the TX processing circuitry 234 in any of the transceivers 210 may be configured to perform frequency upconversion but not OOK modulation. In such embodiments, the transceiver 210 may include a comparator 236 and, possibly, also a separate OOK modulation network 238. The comparator 236 may be configured to receive a baseband or IF signal (i.e., a sequence of analog values) indicative of data to be transmitted by the TX antenna array 232 of the transceiver 210 (the data to be transmitted illustrated in FIG. 2 as a thick arrow towards the transceiver 210, labeled "TX bits") and to convert the analog values to binary digital values which are eventually provided to the TX processing circuitry 234 so that the TX signal 235 can be based on the TX bits provided to the transceiver 210 (i.e., so that the TX signal 235 is an RF signal that has been modulated to encode the data to be transmitted by the TX antenna array 232 of the transceiver 210). If used, the modulation network 238 may be configured to create OOK modulation to be provided to the TX processing circuitry 234.

In some embodiments, the RX processing circuitry 224 in any of the transceivers 210 may be configured to perform frequency downconversion but not OOK demodulation. In such embodiments, the transceiver 210 may be configured to generate an IF signal 225 (i.e., a sequence of analog values). In some embodiments, the OOK demodulation may occur at the IF frequency. The transceiver 210 may include a comparator 226. The comparator 226 may be configured to receive a baseband or IF signal 225 (i.e., a sequence of analog values) and generate binary digital values indicative of data received by the RX antenna array 222 of the transceiver 210 (the data received by the RX antenna array 222 is illustrated in FIG. 2 as a thick arrow away from the transceiver 210, labeled "RX bits").

In some embodiments, any of the RF transceivers 210 may be implemented in an IC package, e.g., in a multi-chip laminate IC package. The IC package may use advanced packaging technology and circuit structures in order to isolate co-located RX and TX ICs. In some embodiments, any of the transceivers 210 may include the RX and TX antenna arrays 222, 232 and the RX and TX processing circuitries 224, 234 integrated on a single die, or integrated in a single multi-chip package (as is shown in FIG. 2 with a dashed contour around these components).

In some embodiments, any of the RF transceivers 210 may incorporate a broad frequency band directional antenna into the laminate package. Antenna may be a single or in an array arrangement or other type of compatible antenna. Link frequency can be mm-wave in order to achieve small antenna size.

FIG. 3 provides a schematic illustration of an antenna module 300 that may be implemented in an RF system configured to implement full-duplex wireless data transfer for rotary joints, e.g., in the RF system 200 of FIG. 2, according to some embodiments of the present disclosure. As shown in FIG. 3, the antenna module 300 may be a single element of a phased antenna array with their feeding terminal/network (linear or sequential feeding). Each antenna module may include any suitable elements configured to wirelessly transmit and/or receive RF signals, such as dipoles, open-ended waveguides, slotted waveguides, microstrip antennas, planar, volumetric, 3D printed and the like. As shown in FIG. 3, the antenna module 300 may include top patch antennas 310 (four of which are shown but only one is labeled in order to not clutter the drawing), bottom patch antennas 320 (also, four of which are shown but only one is labeled in order to not clutter the drawing), and an antenna feed network 330. The top patch antennas 310 may be used implement the RX antenna array 222, while the bottom patch antennas 320 may be used to implement the TX antenna array 232 of the transceiver 200, or vice versa. The antenna feed network 330 may be configured to route feed signals to/from the top patch antennas 310 and the bottom patch antennas 320 to enable the RX and TX antenna arrays to function as described above.

Figure 4:
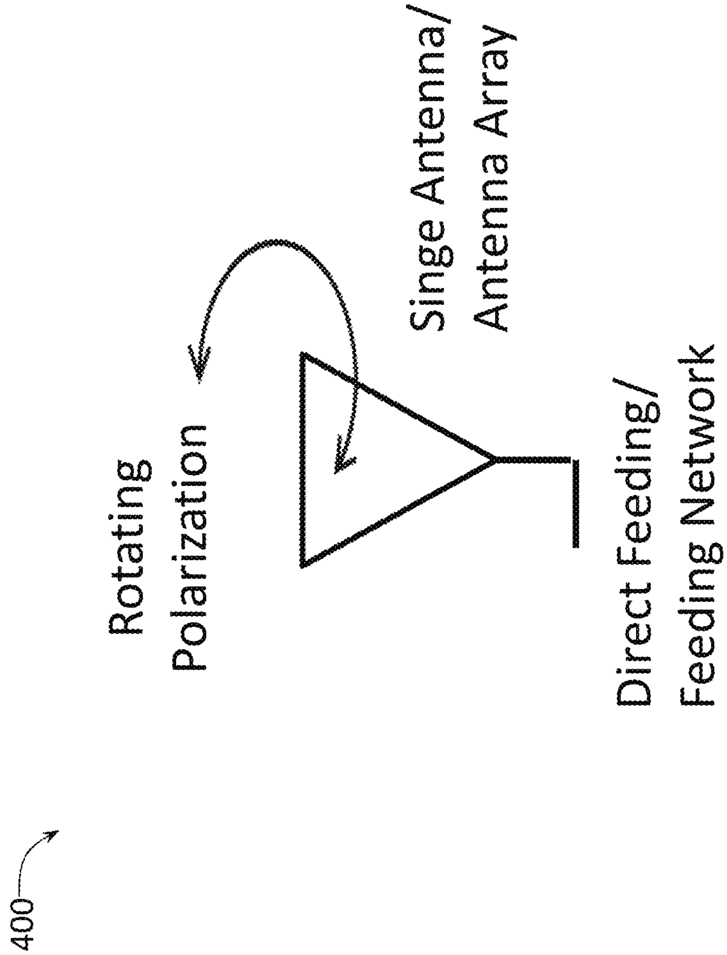
FIG. 4 provides a schematic illustration of a rotating polarization antenna that may be implemented in an RF system configured to implement full-duplex wireless data transfer for rotary joints, according to some embodiments of the present disclosure.

FIG. 4 provides a schematic illustration of a rotating polarization antenna that may be implemented in an RF system configured to implement full-duplex wireless data transfer for rotary joints, according to some embodiments of the present disclosure, e.g., in the RF system 200.

Figure 5:
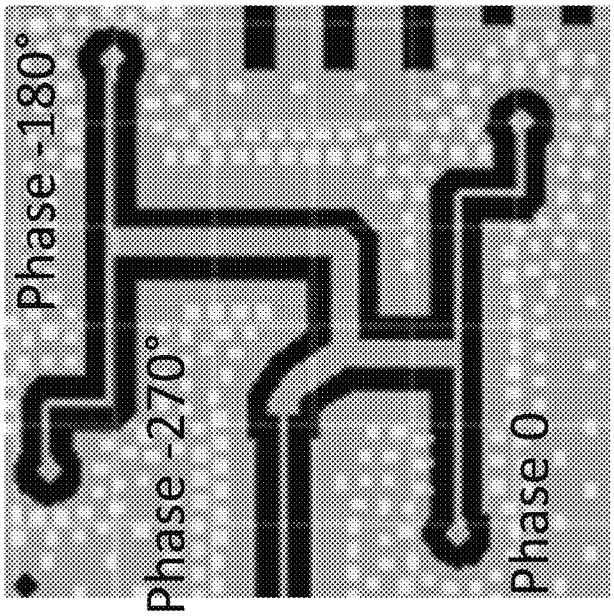
FIG. 5 provides a schematic illustration of a design for realizing a right-hand circular polarization in an RF system configured to implement full-duplex wireless data transfer for rotary joints, according to some embodiments of the present disclosure.

FIG. 5 provides a schematic illustration of an example phase shifter 500 for realizing a right-hand circular polarization in an RF system configured to implement full-duplex wireless data transfer for rotary joints, e.g., in the RF system 200, according to some embodiments of the present disclosure. In an array antenna, the RF current from the transmitter may be fed to the individual antennas with the correct phase relationship so that the radio waves from the separate antennas add together to increase the radiation in a desired direction, while cancelling to suppress radiation in undesired directions. In a phased array, the power from the transmitter is fed to the antennas through phase shifters which can alter the phase, thus steering the beam of radio waves to a different direction. The phase shifter 500 may, e.g., be included in the RHCP antenna of any of the RF transceivers 210.

In order to allow full-duplex communication, novel circuitry may be used in the antenna structure in order to provide improved electrical isolation between sub-bands such as simultaneous orthogonal polarizations, frequency separation, physical distance, or frequency diplexer.

FIG. 6 provides a schematic illustration of a diplexer 600 for an RF system configured to implement full-duplex wireless data transfer for rotary joints, e.g., the RF system 200, according to some embodiments of the present disclosure. The diplexer 600 may be used to transmit inputs and outputs to and from the HB and the LB antennas in a given RF transceiver 210. As shown in FIG. 6, the diplexer 600 may receive a diplexer input/output 610 which may be coupled to an antenna array. When the diplexer input/output 610 is a diplexer input, the diplexer input 610 may receive an electrical signal output by the antenna array. The diplexer input 610 may be split between two paths. In a first path, a portion of the diplexer input 610 may go through a bandpass filter (BPF) or a high-pass filter 620, configured to provide a HB output 622 (which may be either for TX or RX). In a second path, a portion of the diplexer input 610 may go through a BPF or a low-pass filter 630, configured to provide a LB output 632 (which may be either for TX or RX). The HB output 622 may be a signal having frequencies in the HB range as described above, while the LB output 632 may be a signal having frequencies in the LB range as described above. Analogous is applied in a reversed direction when the diplexer input/output 610 is a diplexer output.

In some embodiments, the diplexer input/output 610 may simultaneously receive and transmit signals from/to the antenna array. One example of such use of the diplexer 600 is shown in FIG. 10.

Using Antenna Polarization to Enable Full-Duplex Wireless Data Transfer for Rotary Joints Inventors of the present disclosure realized that systems with rotating components present unique challenges to wireless data transfer that are not present for systems with static components.

Figure 7:
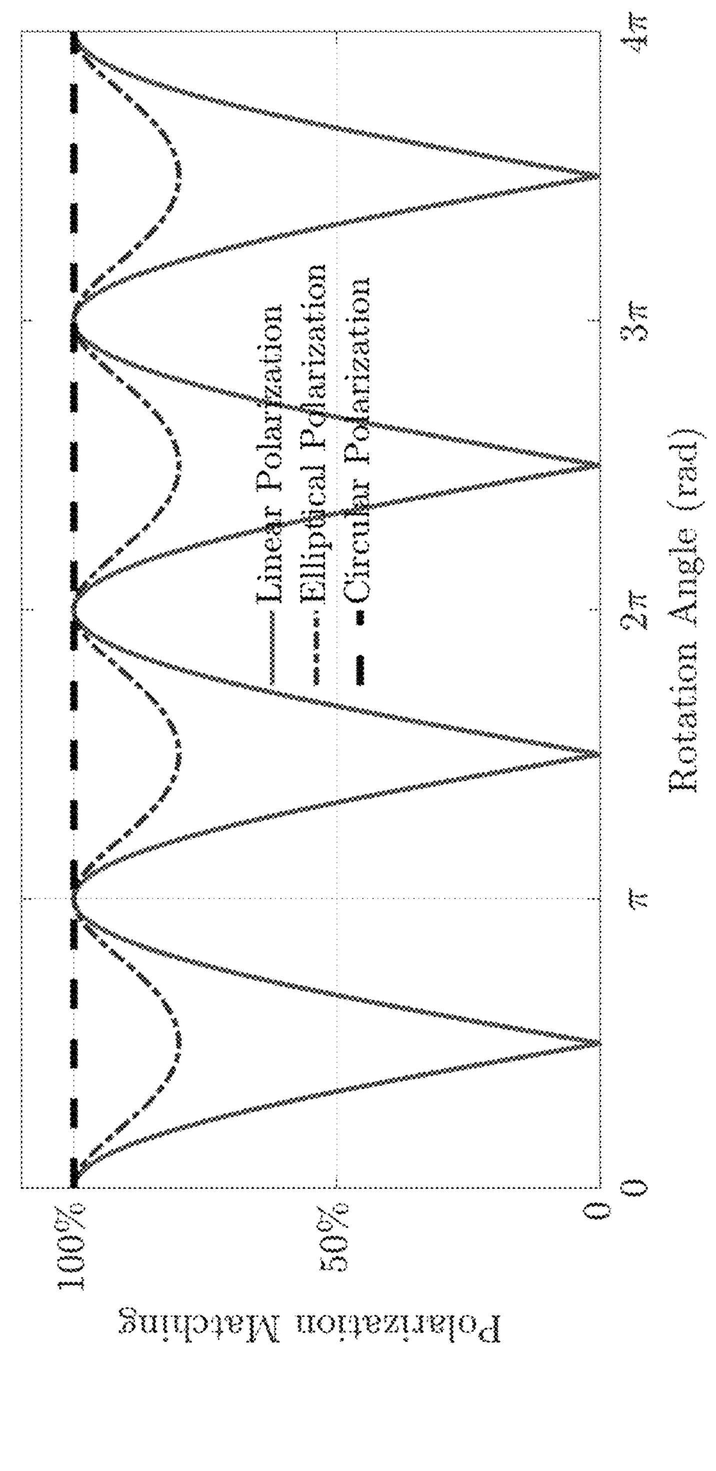
FIG. 7 provides a schematic illustration of how polarization matching depends on a rotation angle for different types of polarization, according to some embodiments of the present disclosure.

FIG. 7 provides a schematic illustration of how polarization matching depends on a rotation angle for different types of polarization, according to some embodiments of the present disclosure. In context of data transfer between two components of a rotating joint (e.g., two components 110, 120, provided with, respectively, first and second RF transceivers 210, described above), which may be described as Module 1 and Module 2, polarization matching refers to how polarization of an antenna of Module 1 (e.g., the RF transceiver 210-1) matches that of an antenna of Module 2 (e.g., the RF transceiver 210-2) when Module 1 transmits data that Module 2 is intended to receive, or vice versa. The closer the matching, the higher is the efficiency of data transfer. Ideally, antennas of both modules should have the same polarization for the most efficient data transfer. That presents challenges when the modules rotate with respect to one another. For example, assume that both modules are designed to have linearly polarized antennas with the same type of linear polarization, e.g., both with vertical polarization. Since the polarization of an antenna refers to the orientation of the electric field of an electromagnetic wave with respect to the surface of Earth, orientation of each of the modules with respect to the Earth's surface comes into play. While two modules may be originally designed and placed in such a way that they have linearly polarized antennas with the same type of linear polarization, if one or both of these modules rotates, the orientation of the linear polarization changes, and may be in a situation where the linear polarizations are orthogonal to one another, in which case there is no polarization matching and no data transfer is possible. This is illustrated with the solid line shown in FIG. 7. When Module 1 and Module 2 have 0 degrees rotation with respect to one another, their polarization matching may be ideal, resulting in optimal data transfer. However, when a rotation angle between these modules increases, polarization matching gradually decreases and becomes minimum when the rotation angle is 90 degrees. For larger rotation angles, polarization matching may gradually increase and again reach its' maximum when the rotation angle is 270 degrees, and so on. Thus, FIG. 7 illustrates that using linearly polarized antennas in the RF units (e.g., in the RF transceivers 210, described above), would result in intermittent data transmission. FIG. 7 further illustrates that the polarization matching of modules that may rotate with respect to one another may be improved when both modules have elliptically polarized antennas (see the dot-dashed line shown in FIG. 7), and that the polarization matching may be optimal when both modules have circularly polarized antennas (see the dashed line shown in FIG. 7).

Figure 8:
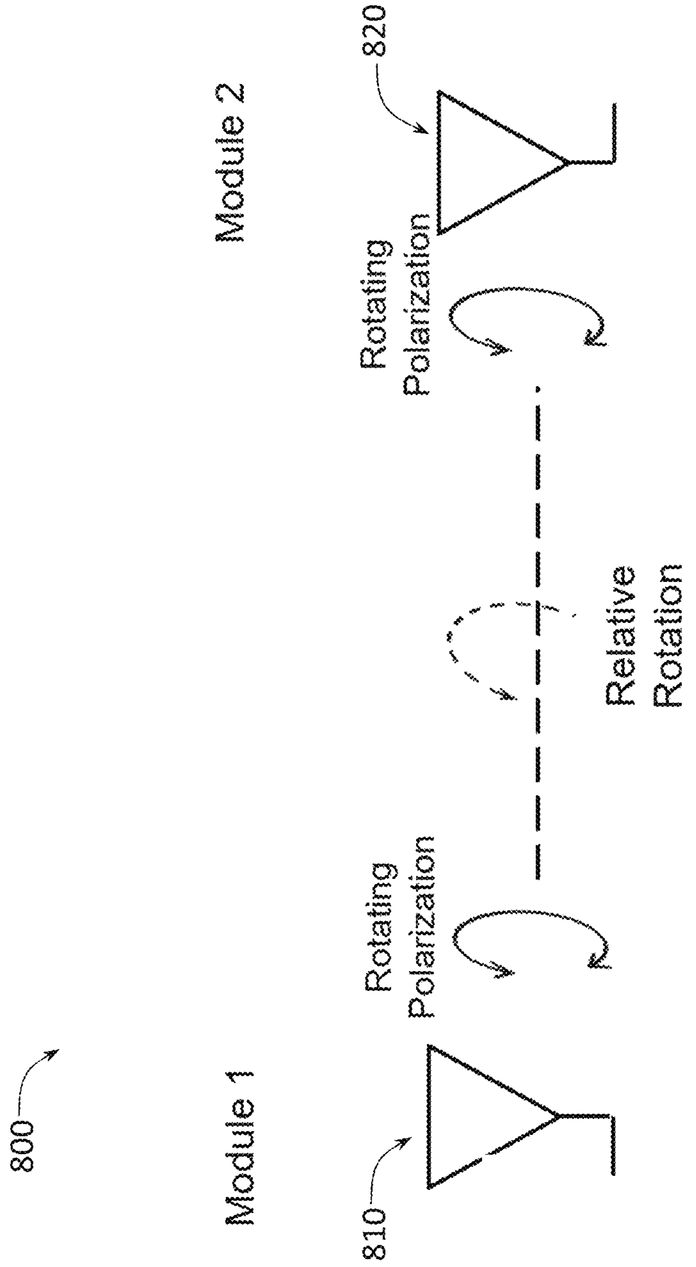
FIG. 8 provides a schematic illustration of two modules with elliptically polarized antennas for implementing full-duplex wireless data transfer, according to some embodiments of the present disclosure.

FIG. 8 provides a schematic illustration of two modules, Module 1 (e.g., the RF transceiver 210-1) and Module 2 (e.g., the RF transceiver 210-2), with elliptically polarized antennas for implementing full-duplex wireless data transfer, according to some embodiments of the present disclosure. As shown in FIG. 8, each of the modules may have a single antenna or an antenna array, 810 and 820, with elliptical polarization, e.g., with circular polarization (circular polarization is a subset of all elliptical polarizations, namely a subset with two axes of the ellipse being equal). Data transmission between such modules may be improved, compared to linearly polarized antennas, as illustrated in FIG. 7.

Figure 9:
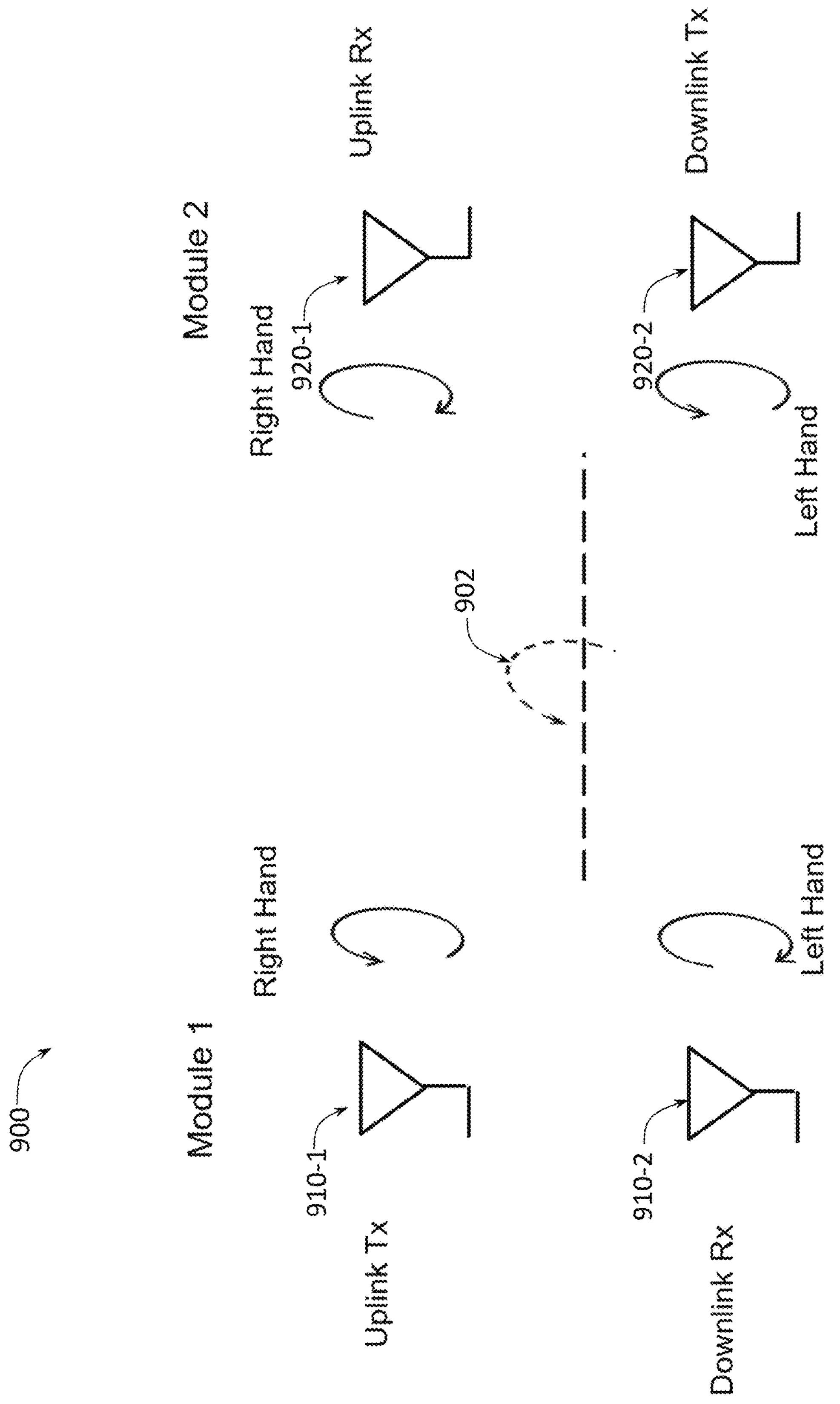
FIG. 9 provides a schematic illustration of a first configuration for a wireless communication system arranged to implement uplink and downlink communications using two modules with elliptically polarized antennas for implementing full-duplex wireless data transfer, according to some embodiments of the present disclosure.

In order to enable full-duplex communication between the modules (i.e., communication where each module can simultaneously transmit and receive data), some means for differentiating between the data being transmitted and the data being received need to be provided for each module. FIGS. 9 and 10 provide two alternative configurations for uplink and downlink communications between two modules with elliptically polarized antennas. In context of Module 1 and Module 2 shown in FIGS. 9 and 10, the term "uplink" is used to refer to a communication when Module 1 is transmitting data and Module 2 is receiving data, while the term "downlink" is used to refer to a communication when Module 2 is transmitting data and Module 1 is receiving data.

FIG. 9 provides a schematic illustration of a first configuration for a wireless communication system 900 arranged to implement uplink and downlink communications using two modules, Module 1 and Module 2, with elliptically polarized (e.g., circularly polarized) antennas for implementing full-duplex wireless data transfer, according to some embodiments of the present disclosure. At least one of Module 1 and Module 2 is configured to rotate with respect the other one, e.g., in a direction of rotation illustrated with a dashed arrow 902. In particular, FIG. 9 illustrates that, in some embodiments, each of the Module 1 and Module 2 may be configured to implement antennas of orthogonal polarization for transmission and for receipt of data. For example, as shown in FIG. 9, in some embodiments, Module 1 (e.g., the RF transceiver 210-1) may include a first antenna 910-1 with right-hand circular (or elliptical) polarization and include a second antenna 910-2 with a left-hand circular (or elliptical) polarization, which is orthogonal (or cross) to the right-hand circular (or elliptical) polarization of the first antenna 910-1. Similarly, Module 2 (e.g., the RF transceiver 210-2) may include a first antenna 920-1 with right-hand circular (or elliptical) polarization and include a second antenna 920-2 with a left-hand circular (or elliptical) polarization, which is orthogonal (or cross) to the right-hand circular (or elliptical) polarization of the first antenna 920-1. As shown in FIG. 9, in the uplink communication as defined herein, Module 1 transmits data using the antenna 910-1 and Module 2 receives data using the antenna 920-1, while in the downlink communication as defined herein, Module 1 receives data using the antenna 910-2 and Module 2 transmits data using the antenna 920-2. For example, Module 1 of FIG. 9 may be the second transceiver 210-2 and Module 2 may be the first transceiver 210-1 for the example illustrated in FIG. 2. In such an example, in Module 1, the first antenna 910-1 may be the TX antenna array 232-2 of the second transceiver 210-2, while the second antenna 910-2 may be the RX antenna array 222-2 of the second transceiver 210-2. On the other hand, in Module 2, the first antenna 920-1 may be the RX antenna array 222-1 of the first transceiver 210-1, while the second antenna 920-2 may be the TX antenna array 232-1 of the first transceiver 210-1.

FIG. 10 provides a schematic illustration of a second configuration for a wireless communication system 1000 arranged to implement uplink and downlink communications using two modules, Module 1 and Module 2, with elliptically polarized (e.g., circularly polarized) antennas for implementing full-duplex wireless data transfer, according to some embodiments of the present disclosure. At least one of Module 1 and Module 2 is configured to rotate with respect the other one, e.g., in a direction of rotation illustrated with a dashed arrow 1002. In particular, FIG. 10 illustrates that, in some embodiments, each of the Module 1 and Module 2 may be configured to implement frequency separation for transmission and for receipt of data. For example, as shown in FIG. 10, in some embodiments, each of Module 1 (e.g., the RF transceiver 210-1) and Module 2 (e.g., the RF transceiver 210-2) may include a wideband single antenna or an antenna array 1010 and 1020 (where a wideband antenna may be implemented using a plurality of narrow-band antennas in some embodiments), coupled to a respective diplexer 1012 and 1022. The antenna 1010 may include the RX antenna array 222 and the TX antenna array 232 as described above. Each of the diplexers 1012 and 1022 may be the diplexer 600 as shown in FIG. 6.

As shown in FIG. 10, in the uplink communication as defined herein, Module 1 may be configured to transmit data in the LB of the antenna 1010 and Module 2 may be configured to receive data using the LB of the antenna 1020, while in the downlink communication as defined herein, Module 1 may be configured to receive data in the HB of the antenna 1010 and Module 2 may be configured to transmit data using the HB of the antenna 1020. In some embodiments of such a configuration, either both modules have antennas with right-hand circular (or elliptical) polarization or both modules have antennas with left-hand circular (or elliptical) polarization. For example, Module 1 of FIG. 10 may be the second transceiver 210-2 and Module 2 may be the first transceiver 210-1 for the example illustrated in FIG. 2. In such an example, in Module 1, the wideband antenna 1010 may be a combination of the RX antenna array 222-2 of the second transceiver 210-2 and the TX antenna array 232-2 of the second transceiver 210-2. On the other hand, in Module 2, the wideband antenna 1020 may be a combination of the RX antenna array 222-1 of the first transceiver 210-1 and the TX antenna array 232-1 of the first transceiver 210-1.

In still further embodiments, frequency separation may be combined with orthogonal polarizations in order to further improve isolation between co-located receiver and transmitter. In other words, a combination of FIG. 9 and the frequency separation approach of the up- and downlink which would result in additional filtering components in the modules is possible and is within the scope of the present disclosure. In some such embodiments, diplexer or broadband antennas may be excluded, but filtering in each signal path will be involved.

Integrating Wireless Data Transfer for Rotary Joints with a Waveguide

Inventors of the present disclosure further realized that data transfer between two components of a rotating joint (e.g., two components 110, 120, provided with, respectively, first and second RF transceivers 210, described above) may be further improved by providing a waveguide (e.g., an OEWG) in between these components.

Figure 11A:
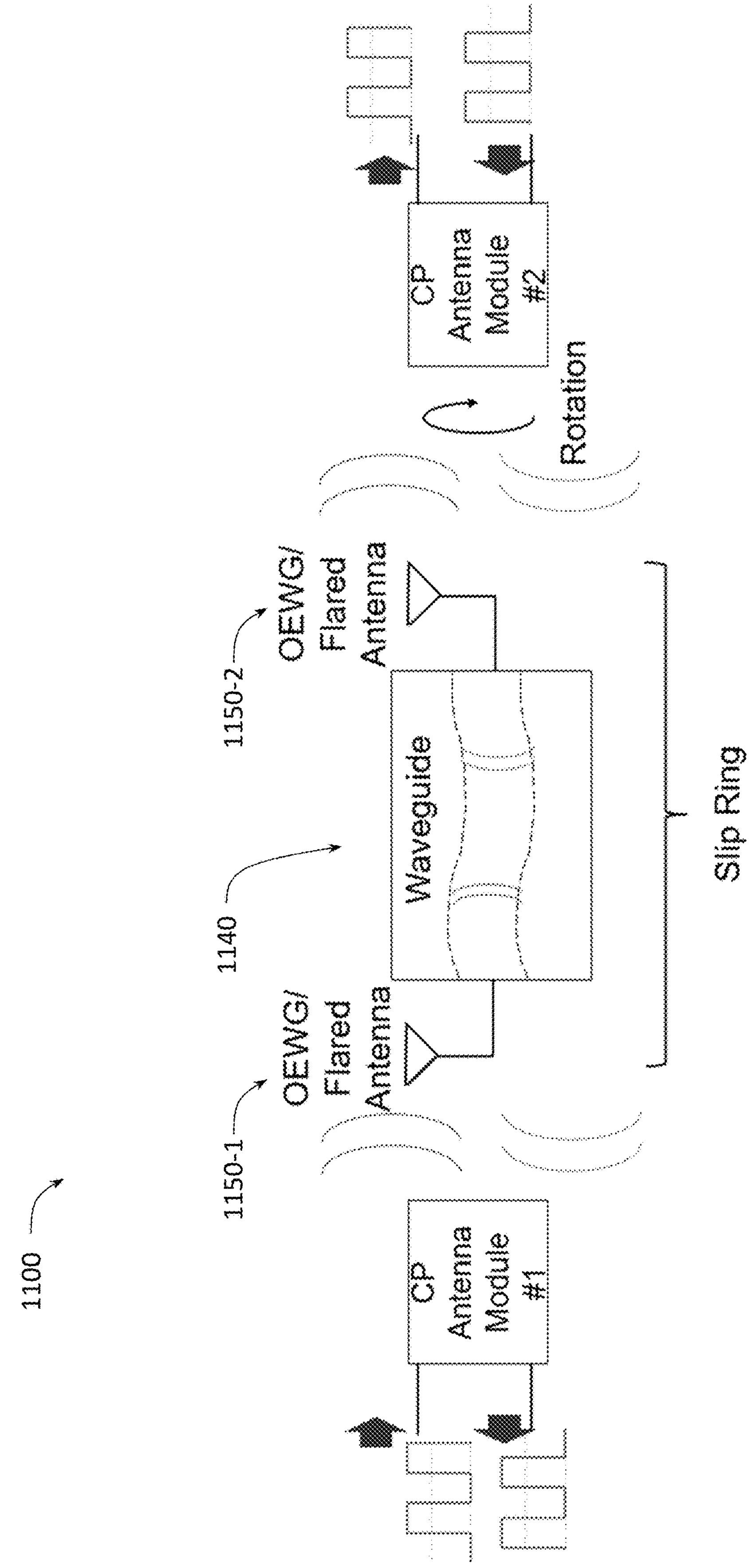
FIGS. 11A and 11B provide schematic illustrations of a system for semi-closed wireless data transfer for rotary joints, according to some embodiments of the present disclosure.
Figure 11B:
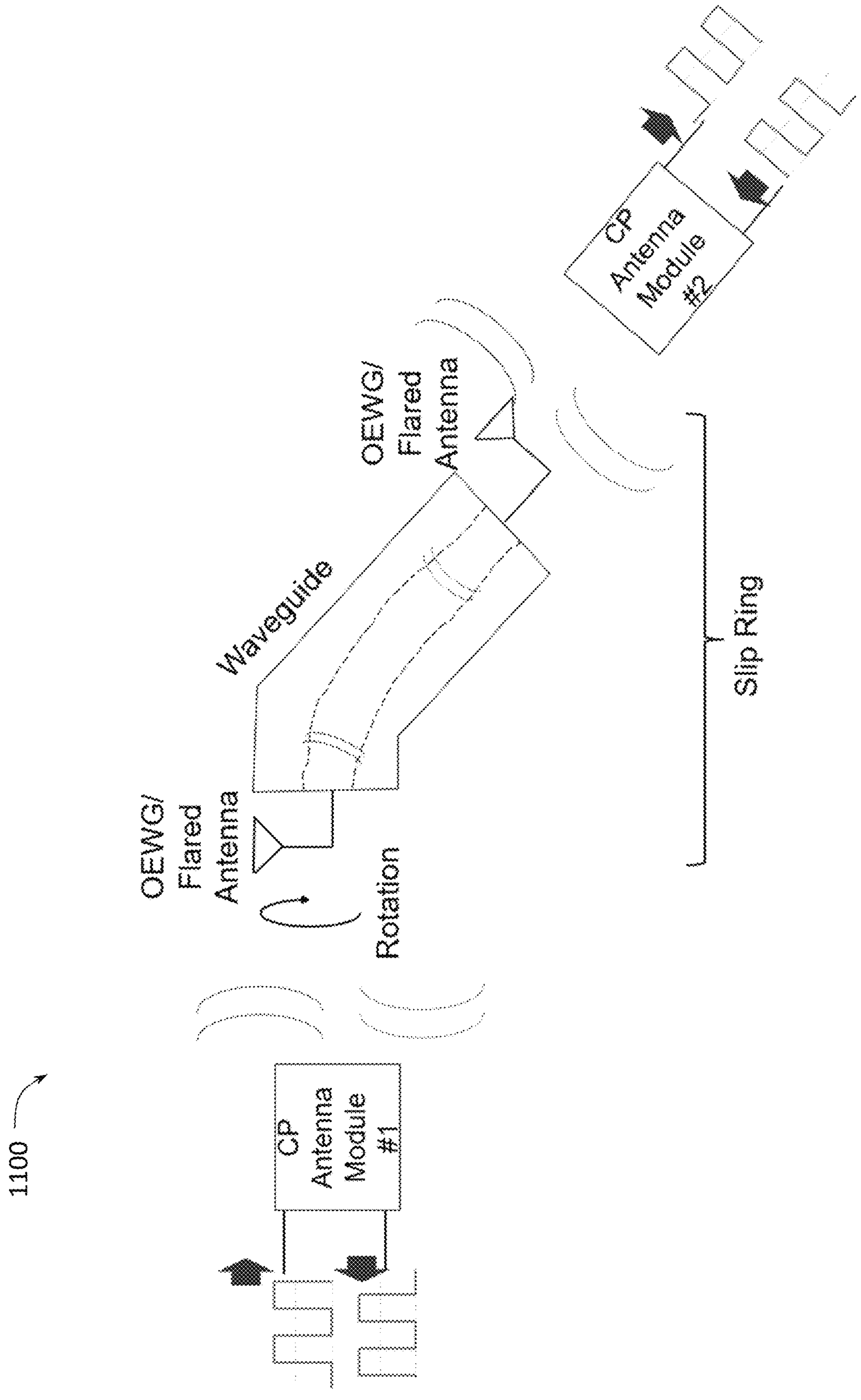

FIGS. 11A and 11B provide schematic illustrations of a system 1100 for semi-closed wireless data transfer for rotary joints, according to some embodiments of the present disclosure. FIGS. 11A and 11B illustrate that the system 1100 includes CP antenna module 1 and CP antenna module 2, which may be, respectively, Module 1 and Module 2 of a wireless communication system (e.g., the system 900 as shown in FIG. 9 or the system 1000 as shown in FIG. 10) arranged to implement uplink and downlink wireless communications with elliptically polarized (e.g., circularly polarized) antennas for implementing full-duplex wireless data transfer.

In various embodiments, each of the CP modules 1 and 2 of the system 1100 may be a CP antenna that can be either LHCP, RHCP, or a combination of both as a dual polarized antenna. In various embodiments, each of the CP modules 1 and 2 of the system 1100 may be either planar or made of any other antenna type. In various embodiments, each of the CP modules 1 and 2 of the system 1100 may be a single antenna or in an array arrangement. In various embodiments, each of the CP modules 1 and 2 of the system 1100 may have an antenna aperture between about $3\lambda^2$ and $15\lambda^2$, where λ is the wavelength of the signal being transmitted. In various embodiments, the half-power beam width (HPBW) of the antennas of each of the CP modules 1 and 2 of the system 1100 may be between about 15 and 30 degrees. In various embodiments, each of the CP modules 1 and 2 of the system 1100 may have a CP antenna with an axial ratio below about 5 dB. In general, the CP antenna modules 1 and 2 of FIGS. 11A and 11B may be implemented as the RF transceivers 210-1 and 210-2 and all of the descriptions provided with respect to the transceivers 210, and to the Modules 1 and 2 of FIGS. 9 and 10 are applicable to the CP antenna modules 1 and 2 of FIGS. 11A and 11B except for the differences described below.

What is different in the system 1100 of FIGS. 11A and 11B is that the system further includes a waveguide 1140 between the CP antenna modules 1 and 2, separated by a gap from each of the CP antenna modules 1 and 2. In various embodiments, the waveguide 1140 may be implemented either together with the CP antenna module 1 or the CP antenna module 2. The waveguide 1140 may be a circular waveguide and, therefore, may have a circular interface. A diameter of the circular openings at the opposite ends of the waveguide 1140 may vary between about 0.65λ and 0.95λ. In some embodiments, at least one of the opposite ends of the waveguide 1140 may be an OEWG end and/or, in some embodiments, the circular openings at the at least one of the opposite ends of the waveguide 1140 may be flared near the edges. Possibility of either one of such embodiments, for either end of the waveguide 1140, is indicated in FIGS. 11A and 11B by the elements 1150-1 and 1150-2 labeled as "OEWG/Flared Antenna" and shown at the opposite ends of the waveguide 1140. In some embodiments, only one end of the waveguide 1140 may be flared, and the opposite end may be not flared. In some such embodiments, the other end may be OEWG. In other embodiments, both ends of the waveguide 1140 may be flared. Still in other embodiments, both ends of the waveguide 1140 may be OEWG. In some embodiments where at least one end of the waveguide 1140 is flared, the flared aperture may be between about $3\lambda^2$ and $15\lambda^2$, where λ is a wavelength of the wireless signal being transmitted. In some embodiments where at least one end of the waveguide 1140 is flared, the flaring angle may be between about 20° and 40°.

The slip ring RF interface can have openings that are of square or elliptical cross-sections that can transmit RF signals through. In some embodiments, the length of the waveguide 1140 may be between about 3 centimeters and about 20 centimeters, e.g., about 5 centimeters. Expressed in terms of the wavelength λ of the signal to be transmitted, in some embodiments, the length of the waveguide 1140 may be between about λ and 40λ. In some embodiments, the distance between an end of the waveguide 1140 and the respective (i.e., nearest) CP antenna module 1 or 2 may be between about 0.5 centimeter and about 5 centimeters, e.g., about 1 centimeter. Expressed in terms of the wavelength λ of the signal to be transmitted, in some embodiments, the distance between an end of the waveguide 1140 and the respective CP antenna module 1 or 2 may be between about 2λ and 25λ. The illustrations of FIGS. 11A and 11B show that, in various embodiments, the slip ring RF interface can be straight, as shown in FIG. 11A, or bent, as shown in FIG. 11B. Any such bend may be realized by, e.g., being machined or by the waveguide 1140 being a semi-rigid waveguide.

The system 1100 may operate as follows. A transmitter module (i.e., one of the CP antenna modules 1 and 2) may generate a CP signal to be picked up by the circular interface at one end of the waveguide 1140. The waveguide 1140 acts as an antenna naturally, a receive antenna in this case. The signal that was picked up is transmitted through the waveguide 1140, where the waveguide 1140 preserves the CP nature of the wave to be re-radiated on the other end of the OE 1140, to be transmitted wirelessly and to be picked up by a receiver module (i.e., the other one of the CP antenna modules 1 and 2). In this case, the waveguide 1140 acts as a transmit antenna. Such a solution may support aligned arrangements (e.g., as shown in FIG. 11A) and non-aligned arrangements (e.g., as shown in FIG. 11B). In particular, bending the waveguide 1140 may help to deliver the signal between the opposite ends of the waveguide 1140. The system 1100 interfaces the open solution based on RF electronics (i.e., the CP antenna modules 1 and 2) to a closed slip ring, forming a semi-closed system.

Example Data Processing System

Figure 12:
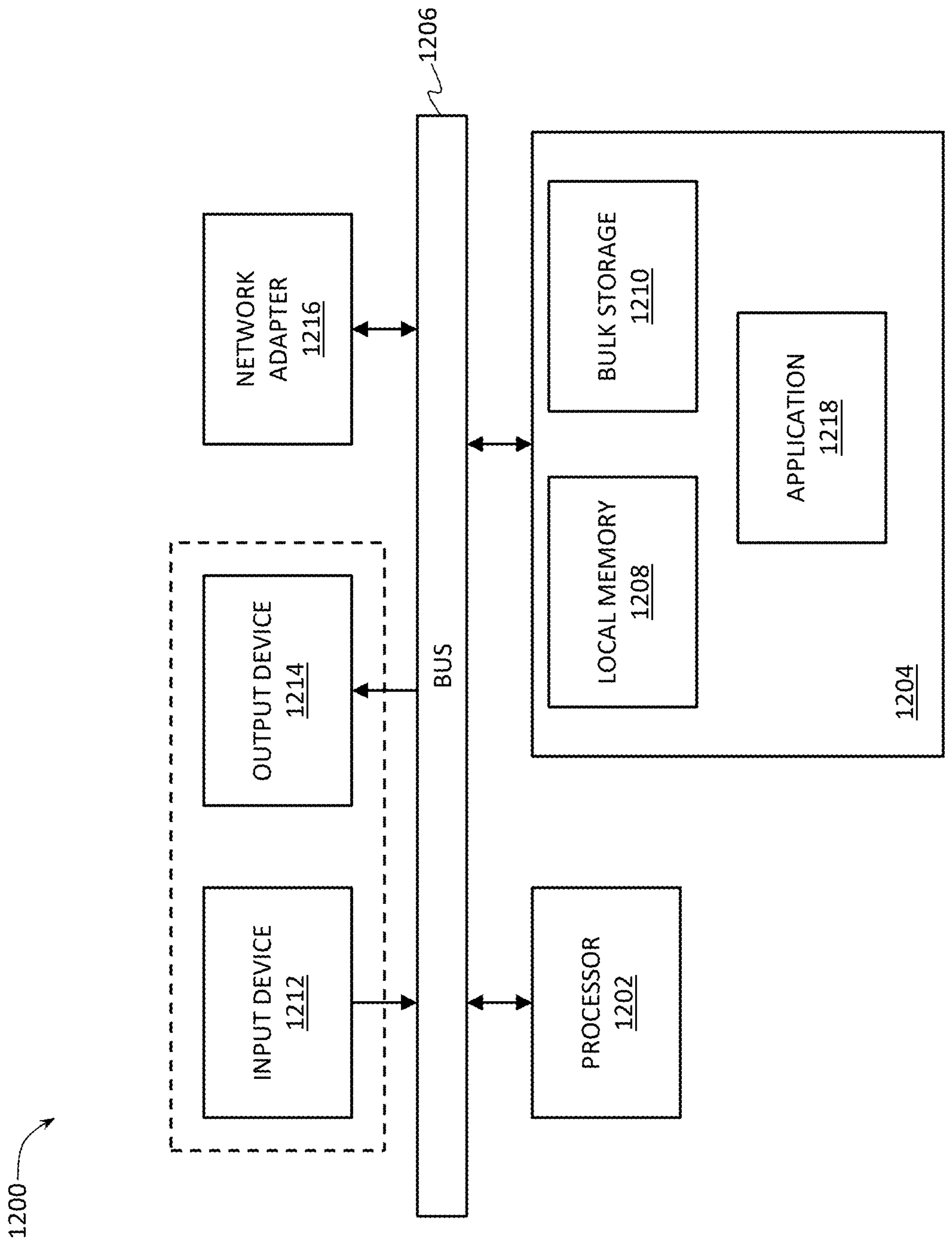
FIG. 12 provides a block diagram illustrating an example data processing system that may be configured to implement at least portions of a system for semi-closed wireless data transfer for rotary joints, according to some embodiments of the present disclosure.

FIG. 12 provides a block diagram illustrating an example data processing system 1200 that may be configured to implement at least portions of a system for semi-closed wireless data transfer for rotary joints, according to some embodiments of the present disclosure.

As shown in FIG. 12, the data processing system 1200 may include at least one processor 1202, e.g., a hardware processor 1202, coupled to memory elements 1204 through a system bus 1206. As such, the data processing system may store program code within memory elements 1204. Further, the processor 1202 may execute the program code accessed from the memory elements 1204 via a system bus 1206. In one aspect, the data processing system may be implemented as a computer that is suitable for storing and/or executing program code. It should be appreciated, however, that the data processing system 1200 may be implemented in the form of any system including a processor and a memory that is capable of performing the functions described within this disclosure.

In some embodiments, the processor 1202 can execute software or an algorithm to perform the activities as discussed in the present disclosure, in particular activities related to full-duplex wireless data transfer for rotary joints. The processor 1202 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (ASIC), or a virtual machine processor. The processor 1202 may be communicatively coupled to the memory element 1204, for example in a direct-memory access (DMA) configuration, so that the processor 1202 may read from or write to the memory elements 1204.

In general, the memory elements 1204 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the systems configured to implement semi-closed wireless data transfer for rotary joints, as described herein, or any of the components of the data processing system 1200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements of the systems configured to implement semi-closed wireless data transfer for rotary joints, described herein, and the processor 1202, can also include suitable interfaces for receiving, transmitting, and/or otherwise communicating data or information in a network environment.

In certain example implementations, mechanisms for semi-closed wireless data transfer for rotary joints as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as, the memory elements 1204 shown in FIG. 12, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as, the processor 1202 shown in FIG. 12, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 1204 may include one or more physical memory devices such as, for example, local memory 1208 and one or more bulk storage devices 1210. The local memory may refer to RAM or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from the bulk storage device 1210 during execution. Various data exchanged using the systems configured to implement semi-closed wireless data transfer for rotary joints as described herein may be stored in the memory elements 1204.

As shown in FIG. 12, the memory elements 1204 may store an application 1218. In various embodiments, the application 1218 may be stored in the local memory 1208, the one or more bulk storage devices 1210, or apart from the local memory and the bulk storage devices. It should be appreciated that the data processing system 1200 may further execute an operating system (not shown in FIG. 12) that can facilitate execution of the application 1218. The application 1218, being implemented in the form of executable program code, can be executed by the data processing system 1200, e.g., by the processor 1202. Responsive to executing the application, the data processing system 1200 may be configured to perform one or more operations or method steps described herein.

Input/output (I/O) devices depicted as an input device 1212 and an output device 1214, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 1214 may be any type of screen display, such as plasma display, liquid crystal display (LCD), organic light emitting diode (OLED) display, electroluminescent (EL) display, or any other indicator, such as a dial, barometer, or LEDs. The output device 1214 may be configured to show the result of the data communication performed using RF systems with highly integrated mm-wave short communication links in accordance with the present disclosure. For example, the output device 1214 may be configured to provide a graphical user interface and display graphical representation of the communications using systems configured to implement semi-closed wireless data transfer for rotary joints, as described herein. In some implementations, the system may include a driver (not shown) for the output device 1214. Input and/or output devices 1212, 1214 may be coupled to the data processing system either directly or through intervening I/O controllers.

In an embodiment, the input and the output devices may be implemented as a combined input/output device (illustrated in FIG. 12 with a dashed line surrounding the input device 1212 and the output device 1214). An example of such a combined device is a touch sensitive display, also sometimes referred to as a "touch screen display" or simply "touch screen". In such an embodiment, input to the device may be provided by a movement of a physical object, such as, a stylus or a finger of a user, on or near the touch screen display.

A network adapter 1216 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1200, and a data transmitter for transmitting data from the data processing system 1200 to said systems, devices and/or networks. Modems, cable modems, and Ethernet cards are examples of different types of network adapter that may be used with the data processing system 1200.

Variations and Implementations

While embodiments of the present disclosure were described above with references to exemplary implementations as shown in FIGS. 1-12, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind).

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions.

In the discussions of the embodiments above, components of a system, such as diplexers, antenna modules, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to semi-closed wireless data transfer for rotary joints.

Parts of various systems for implementing semi-closed wireless data transfer for rotary joints as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present FIGS. may be implemented as stand-alone modules (e.g., a device with associated components and circuitry configured to perform a specific application or function) or implemented as plug-in modules into application specific hardware of electronic devices. Note that particular embodiments of the present disclosure implementing semi-closed wireless data transfer for rotary joints may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package. In various other embodiments, systems configured to implement semi-closed wireless data transfer for rotary joints, proposed herein, may be implemented in one or more silicon cores in ASICS, FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure. The specifications apply only to one non-limiting example and, accordingly, they should be construed as such. In the foregoing description, example embodiments have been described with reference to particular processor and/or component arrangements. Various modifications and changes may be made to such embodiments. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the present FIGS. may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the present FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to semi-closed wireless data transfer for rotary joints, proposed herein, illustrate only some of the possible functions that may be executed by, or within, system illustrated in the present FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications.

Select Examples

Example 1 provides a communication system for a rotary joint assembly, the communication system including a transmitter; a receiver; and a waveguide configured to receive a wireless signal transmitted by the transmitter, transmit through the waveguide (i.e., not wirelessly) a signal, the signal being indicative of the wireless signal received by the waveguide, and transmit a wireless output signal, the wireless output signal being indicative of the signal transmitted through the waveguide, where the receiver is configured to receive the wireless output signal.

Example 2 provides the communication system according to example 1, where at least one of an antenna aperture of the transmitter or an antenna aperture of the receiver is between about $3\lambda^2$ and $15\lambda^2$, where $\lambda$ is a wavelength of the wireless signal.

Example 3 provides the communication system according to examples 1 or 2, where a dimension of the waveguide in a cross-section of the waveguide along a plane perpendicular to a direction of propagation of the signal transmitted through the waveguide is between about $0.65\lambda$ and $0.95\lambda$, where $\lambda$ is a wavelength of the wireless signal.

Example 4 provides the communication system according to example 3, where the cross-section of the waveguide is circular, and where the dimension is a diameter.

Example 5 provides the communication system according to any one of the preceding examples, where the waveguide has a first end and an opposite second end, and where at least one of the first end and the second end is flared, where the flared aperture can be between $3\lambda^2$ and $15\lambda^2$. The flaring angle can be between 20° and 40°.

Example 6 provides the communication system according to any one of the preceding examples, where the waveguide has a first end and an opposite second end, and where at least one of the first end and the second end is an open-ended waveguide end.

Example 7 provides the communication system according to any one of the preceding examples, where at least one of a half-power beam width (HPBW) of the transmitter or an HPBW of the receiver is between about 15 and 30 degrees.

Example 8 provides the communication system according to any one of the preceding examples, where a length of the waveguide is between about $\lambda$ and $40\lambda$, where $\lambda$ is a wavelength of the wireless signal.

Example 9 provides the communication system according to any one of the preceding examples, where a distance between the waveguide and the transmitter between about $2\lambda$ and $25\lambda$, where $\lambda$ is a wavelength of the wireless signal.

Example 10 provides the communication system according to any one of the preceding examples, where a distance between the waveguide and the transmitter is between about 1 and 5 centimeters.

Example 11 provides the communication system according to any one of examples 1-10, where a path of the signal transmitted through the waveguide is substantially a straight line.

Example 12 provides the communication system according to any one of examples 1-10, where a path of the signal transmitted through the waveguide has at least one bend.

Example 13 provides the communication system according to any one of the preceding examples, where the wireless signal is elliptically polarized.

Example 14 provides the communication system according to any one of the preceding examples, where the transmitter is a first transmitter, the receiver is a first receiver, the communication system further includes a second transmitter and a second receiver, the wireless signal is a first wireless signal, the signal transmitted through the waveguide is a first signal, the wireless output signal is a first wireless output signal, the waveguide is further configured to receive a second wireless signal transmitted by the second transmitter, transmit through the waveguide (i.e., not wirelessly) a second signal, the second signal being indicative of the second wireless signal received by the waveguide, and transmit a second wireless output signal, the second wireless output signal being indicative of the second signal transmitted through the waveguide, and the second receiver is configured to receive the second wireless output signal.

Example 15 provides the communication system according to example 14, further including a first transceiver and a second transceiver, where the first transceiver includes the first transmitter and the second receiver, and the second transceiver includes the second transmitter and the first receiver.

Example 16 provides the communication system according to examples 14 or 15, where each of the first wireless signal and the first wireless output signal is left-hand elliptically polarized, and each of the second wireless signal and the second wireless output signal is right-hand elliptically polarized.

Example 17 provides a communication system that includes a first transceiver; a second transceiver; and a waveguide having a first end and an opposite second end, the first end being closer to the first transceiver than the second transceiver, and the second end being closer to the second transceiver than the first transceiver, where the waveguide is configured to capture wireless radio frequency (RF) radiation (i.e., electromagnetic radiation in the RF spectrum) of a signal wirelessly transmitted by the first transceiver, propagate the captured RF radiation through the waveguide, and wirelessly transmit a signal based on the captured RF radiation propagated through the waveguide, and the second transceiver is configured to capture wireless RF radiation of the signal wirelessly transmitted by the waveguide.

Example 18 provides the communication system according to example 17, where a distance between the first end of the waveguide and the first transceiver is between about 1 and 5 centimeters, or a distance between the second end of the waveguide and the second transceiver is between about 2λ and 25λ, where λ is a wavelength of the signal wirelessly transmitted by the first transceiver.

Example 19 provides a communication system that includes a first transceiver; a second transceiver; and a waveguide having a first end and an opposite second end, the first end being closer to the first transceiver than the second transceiver, and the second end being closer to the second transceiver than the first transceiver, where the waveguide is configured to receive, at the first end, a signal wirelessly transmitted by the first transceiver, propagate the signal received at the first end, through a propagation portion of the waveguide, to the second end, and wirelessly transmit, at the second end, a signal indicative of the signal received at the first end and propagated to the second end, where the second transceiver is configured to receive the signal wirelessly transmitted by the waveguide.

Example 20 provides the communication system according to example 19, where the waveguide is spaced apart from each of the first transceiver and the second transceiver.

The invention claimed is:

1. A communication system for a rotary joint assembly, the communication system comprising:

a first antenna module having a first transceiver;

a second antenna module having a second transceiver; and an open-ended waveguide arranged in open space between the first antenna module and the second antenna module and configured to:

receive, at a first end of the open-ended waveguide, using a first antenna, a wireless signal transmitted by the first transceiver, transmit through the open-ended waveguide a signal, the signal being indicative of the wireless signal received by the open-ended waveguide at the first end of the open-ended waveguide, and radiate, at a second end of the open-ended waveguide, using a second antenna, a wireless output signal that is indicative of the signal transmitted through the open-ended waveguide, the second end of the open ended waveguide being opposite the first end of the open-ended waveguide, wherein the second transceiver is configured to receive the wireless output signal.

2. The communication system according to claim 1, at least one of the first antenna or the second antenna having an aperture is between about $3\lambda^2$ and $15\lambda^2$, where λ is a wavelength of the wireless signal.

3. The communication system according to claim 1, wherein a dimension of the open-ended waveguide in a cross-section of the open-ended waveguide along a plane perpendicular to a direction of propagation of the signal transmitted through the open-ended waveguide is between about 0.65λ and 0.95λ, where λ is a wavelength of the wireless signal.

4. The communication system according to claim 3, wherein the cross-section of the open-ended waveguide is substantially circular, and wherein the dimension corresponds to a diameter of the cross-section.

5. The communication system according to claim 1, wherein at least one of the first end or the second end is flared.

6. The communication system according to claim 1, wherein at least one of the first end or the second end is an open-ended waveguide end.

7. The communication system according to claim 1, wherein at least one of a half-power beam width (HPBW) of the first transceiver or an HPBW of the second transceiver is between about 15 degrees and 30 degrees.

8. The communication system according to claim 1, wherein a length of the open-ended waveguide is between about λ and 40λ, where λ is a wavelength of the wireless signal.

9. The communication system according to claim 1, wherein a distance between the first end of the open-ended waveguide and the first transceiver is between about 2λ and 25λ, where λ is a wavelength of the wireless signal.

10. The communication system according to claim 1, wherein a distance between the first end of the open-ended waveguide and the first transceiver is between about 1 centimeter and 5 centimeters.

11. The communication system according to claim 1, wherein a path of the signal transmitted through the open-ended waveguide is substantially a straight line.

12. The communication system according to claim 1, wherein a path of the signal transmitted through the open-ended waveguide has at least one bend.

13. The communication system according to claim 1, wherein the wireless signal is elliptically polarized.

14. The communication system according to claim 1, wherein:

the first transceiver comprises a first transmitter, the second transceiver comprises a first receiver, the communication system further includes a second transmitter and a second receiver, the open-ended waveguide is further configured to:

receive, at the second end of the open-ended waveguide, using the second antenna, a second wireless signal transmitted by the second transmitter, transmit through the open-ended waveguide a second signal, the second signal being indicative of the second wireless signal received by the open-ended waveguide at the second end of the open-ended waveguide, and radiate, at the first end of the open-ended waveguide, using the first antenna, a second wireless output signal that is indicative of the second signal transmitted through the open-ended waveguide, and the second receiver is configured to receive the second wireless output signal.

15. The communication system according to claim 14, wherein:

the first transceiver includes the first transmitter and the second receiver, and the second transceiver includes the second transmitter and the first receiver.

16. The communication system according to claim 14, wherein:

each of the wireless signal and the wireless output signal is left-hand elliptically polarized, and each of the second wireless signal and the second wireless output signal is right-hand elliptically polarized.

17. A communication system, comprising:

a first transceiver;

a second transceiver; and an open-ended waveguide having a first end and an opposite second end, the first end being closer to the first transceiver than the second transceiver, and the second end being closer to the second transceiver than the first transceiver, wherein:

the open-ended waveguide is configured to capture radio frequency (RF) radiation of a signal wirelessly transmitted by the first transceiver, propagate the captured RF radiation through the waveguide, and wirelessly transmit a signal based on the captured RF radiation propagated through the open-ended waveguide, and the second transceiver is configured to capture RF radiation of the signal wirelessly transmitted by the open-ended waveguide.

18. The communication system according to claim 17, wherein:

a distance between the first end of the open-ended waveguide and the first transceiver is between about 1 centimeter and 5 centimeters, or a distance between the second end of the open-ended waveguide and the second transceiver is between about 2λ and 25λ, where λ is a wavelength of the signal wirelessly transmitted by the first transceiver.

19. A communication system, comprising:

a first transceiver;

a second transceiver; and an open-ended waveguide having a first end and an opposite second end, the first end being closer to the first transceiver than the second transceiver, and the second end being closer to the second transceiver than the first transceiver, wherein the open-ended waveguide is configured to:

receive, at the first end, a signal wirelessly transmitted by the first transceiver, propagate the signal received at the first end, through a propagation portion of the open-ended waveguide, to the second end, and wirelessly transmit, at the second end, a second signal indicative of the signal received at the first end and propagated to the second end, wherein the second transceiver is configured to receive the second signal wirelessly transmitted by the open-ended waveguide.

20. The communication system according to claim 19, wherein:

the open-ended waveguide is spaced apart from each of the first transceiver and the second transceiver.

* * * * *